(12) United States Patent
Papasakellariou

(10) Patent No.: US 10,873,966 B2
(45) Date of Patent: Dec. 22, 2020

(54) SIGNALING OF CONTROL INFORMATION IN A COMMUNICATION SYSTEM

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/230,686

(22) Filed: Dec. 21, 2018

(65) Prior Publication Data

US 2019/0223205 A1 Jul. 18, 2019

Related U.S. Application Data

(60) Provisional application No. 62/612,914, filed on Jan. 2, 2018, provisional application No. 62/616,228, filed on Jan. 11, 2018.

(51) Int. Cl.
*H04W 72/12* (2009.01)
*H04L 5/00* (2006.01)
*H04W 88/08* (2009.01)

(52) U.S. Cl.
CPC .......... *H04W 72/1289* (2013.01); *H04L 5/00* (2013.01); *H04W 72/1284* (2013.01); *H04W 88/08* (2013.01)

(58) Field of Classification Search
CPC ......... H04W 72/1284; H04W 72/1289; H04W 88/08
See application file for complete search history.

(56) References Cited

U.S. PATENT DOCUMENTS

| | | | |
|---|---|---|---|
| 9,717,084 B2* | 7/2017 | Nishikawa | H04W 72/1257 |
| 2011/0228863 A1 | 9/2011 | Papasakellariou et al. | |
| 2013/0195045 A1* | 8/2013 | Papasakellariou | H04W 72/042 370/329 |
| 2014/0293893 A1* | 10/2014 | Papasakellariou | H04W 72/04 370/329 |
| 2016/0212734 A1 | 7/2016 | He et al. | |
| 2019/0215110 A1* | 7/2019 | Yang | H04W 74/002 |

OTHER PUBLICATIONS

Huawei, HiSilicon, "DCI contents and formats in NR", 3GPP TSG RAN WG1 Meeting #91, Nov. 27-Dec. 1, 2017, 11 pages, R1-1719389.
ZTE, Sanechips, "About DCI contents", 3GPP TSG RAN WG1 Meeting 91, Nov. 27-Dec. 1, 2017, 2 pages, R1-1719490.
Vivo, "DCI contents and design", 3GPP TSG RAN WG1 NR Meeting 91, Nov. 27-Dec. 1, 2017, 6 pages, R1-1719783.
International Search Report dated Apr. 8, 2019 in connection with International Patent Application No. PCT/KR2019/000037, 3 pages.

(Continued)

*Primary Examiner* — Mansour Oveissi
*Assistant Examiner* — David M Oveissi

(57) ABSTRACT

Method and apparatus are provided for decoding a downlink control information (DCI) format that schedules a physical uplink shared channel (PUSCH) transmission and includes a field indicating whether or not data information is multiplexed in the PUSCH and for transmitting the PUSCH with or without data information depending on the indication by the field.

20 Claims, 14 Drawing Sheets

(56) References Cited

OTHER PUBLICATIONS

"3rd Generation Partnership Project; Technical Specification Group Radio Access Network; NR; Physical channels and modulation (Release 15)", 3GPP TS 38.211 V15.1.0, Mar. 2018, 87 pages.
"3rd Generation Partnership Project; Technical Specification Group Radio Access Network; NR; Multiplexing and channel coding", 3GPP TS 38.212 V15.1.0, Mar. 2018, 90 pages.
"3rd Generation Partnership Project; Technical Specification Group Radio Access Network; NR; Physical layer procedures for control (Release 15)", 3GPP TS 38.213 V15.1.0, Mar. 2018, 77 pages.
"3rd Generation Partnership Project; Technical Specification Group Radio Access Network; NR; Physical layer procedures for data (Release 15)", 3GPP TS 38.214 V15.1.0, Mar. 2018, 77 pages.
"3rd Generation Partnership Project; Technical Specification Group Radio Access Network; NR; Medium Access Control (MAC) protocol specification (Release 15)", 3GPP TS 38.321 V15.1.0, Mar. 2018, 67 pages.
"3rd Generation Partnership Project; Technical Specification Group Radio Access Network; NR; Radio Resource Control (RRC) protocol specification", 3GPP TS 38.331 V15.1.0, Mar. 2018, 268 pages.

\* cited by examiner

SIGNALING OF CONTROL INFORMATION IN A COMMUNICATION SYSTEM

CROSS-REFERENCE TO RELATED APPLICATIONS AND CLAIM OF PRIORITY

The present application claims priority to:
U.S. Provisional Patent Application Ser. No. 62/612,914, filed on Jan. 2, 2018; and
U.S. Provisional Patent Application Ser. No. 62/616,228, filed on Jan. 11, 2018.
The content of the above-identified patent document is incorporated herein by reference.

TECHNICAL FIELD

The present application relates generally to control schemes in wireless communication systems. More specifically, this disclosure relates to signaling of control information in wireless communication systems.

BACKGROUND

5th generation (5G) or new radio (NR) mobile communications, initial commercialization of which is expected around 2020, is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beam-forming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G/NR networks may provide flexibility to support various applications meeting part of the above requirements on a use case basis.

SUMMARY

The present disclosure relates to a pre-5th-Generation (5G) or 5G/NR communication system to be provided for supporting higher data rates beyond 4th-Generation (4G) communication system such as long term evolution (LTE). Embodiments of the present disclosure provide signaling of control information in advanced communication systems.

In one embodiment, a method is provided. The method comprises decoding a downlink control information (DCI) format. The DCI format schedules a physical uplink shared channel (PUSCH) transmission and includes a first field indicating whether or not data information is multiplexed in the PUSCH. The method also comprises transmitting the PUSCH. Data information is multiplexed or is not multiplexed in the PUSCH depending on the indication in the first field.

In another embodiment, a user equipment (UE) is provided. The UE comprises a decoder configured to decode a downlink control information (DCI) format. The DCI format schedules a physical uplink shared channel (PUSCH) transmission and includes a first field indicating whether or not data information is multiplexed in the PUSCH. The UE also comprises a multiplexer configured to multiplex or not multiplex data information in the PUSCH depending on the indication in the first field. The UE additionally comprises a transmitter configured to transmit the PUSCH.

In yet another embodiment a base station is provided. The base station comprises an encoder configured to encode a downlink control information (DCI) format. The DCI format schedules a physical uplink shared channel (PUSCH) transmission and includes a first field indicating whether or not data information is multiplexed in the PUSCH. The base station also comprises a de-multiplexer configured to de-multiplex or not de-multiplex data information in the PUSCH depending on the indication in the first field. The base station additionally comprises a receiver configured to receive the PUSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.1.0, "NR, Physical channels and modulation;" 3GPP TS 38.212 v15.1.0, "NR, Multiplexing and Channel coding;" 3GPP TS 38.213 v15.1.0, "NR, Physical Layer Procedures for Control;" 3GPP TS 38.214 v15.1.0, "NR, Physical Layer Procedures for Data;" 3GPP TS 38.321 v15.1.0, "NR, Medium Access Control (MAC) protocol specification;" and 3GPP TS 38.331 v15.1.0, "NR, Radio Resource Control (RRC) Protocol Specification."

Figure 1:
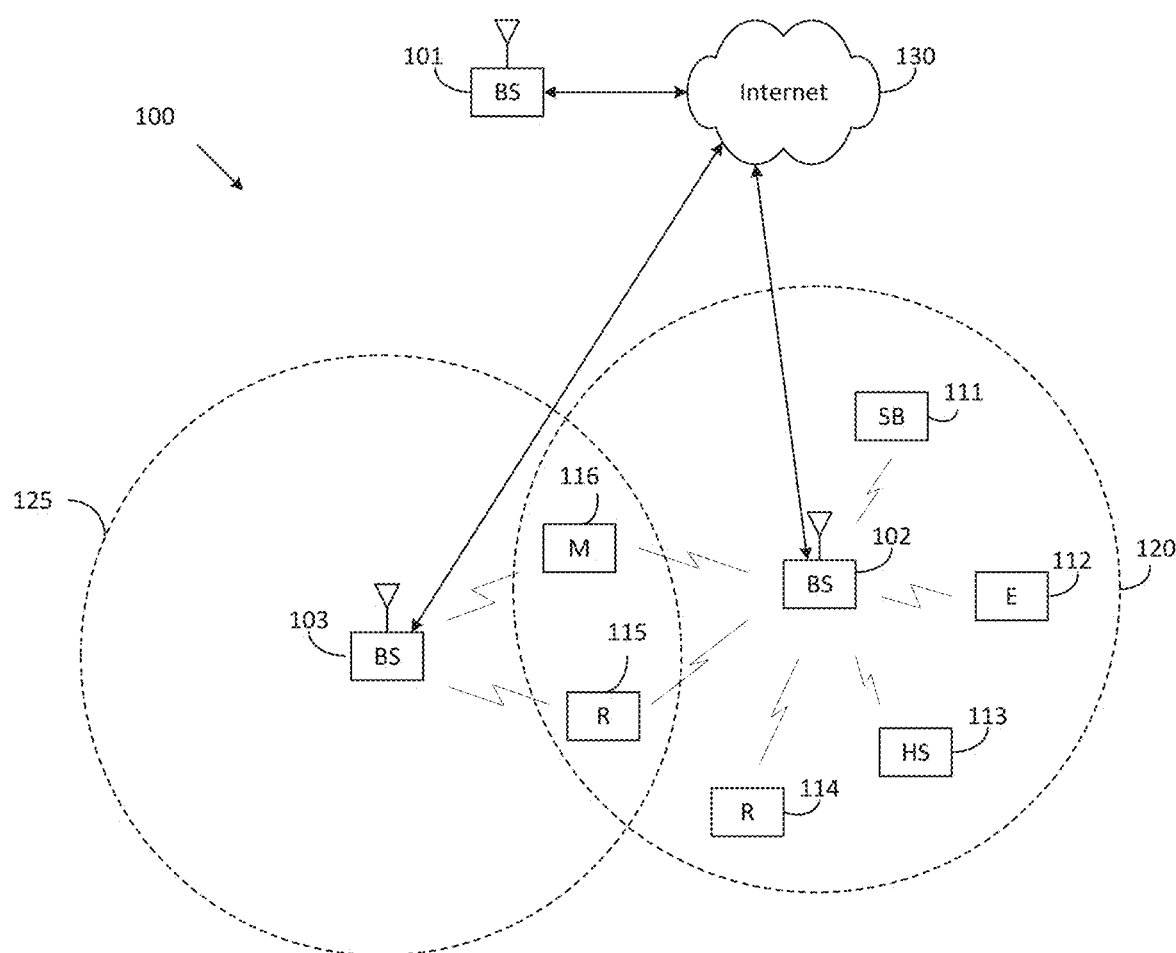
FIG. 1 illustrates an example wireless network according to embodiments of the present disclosure.
Figure 2:
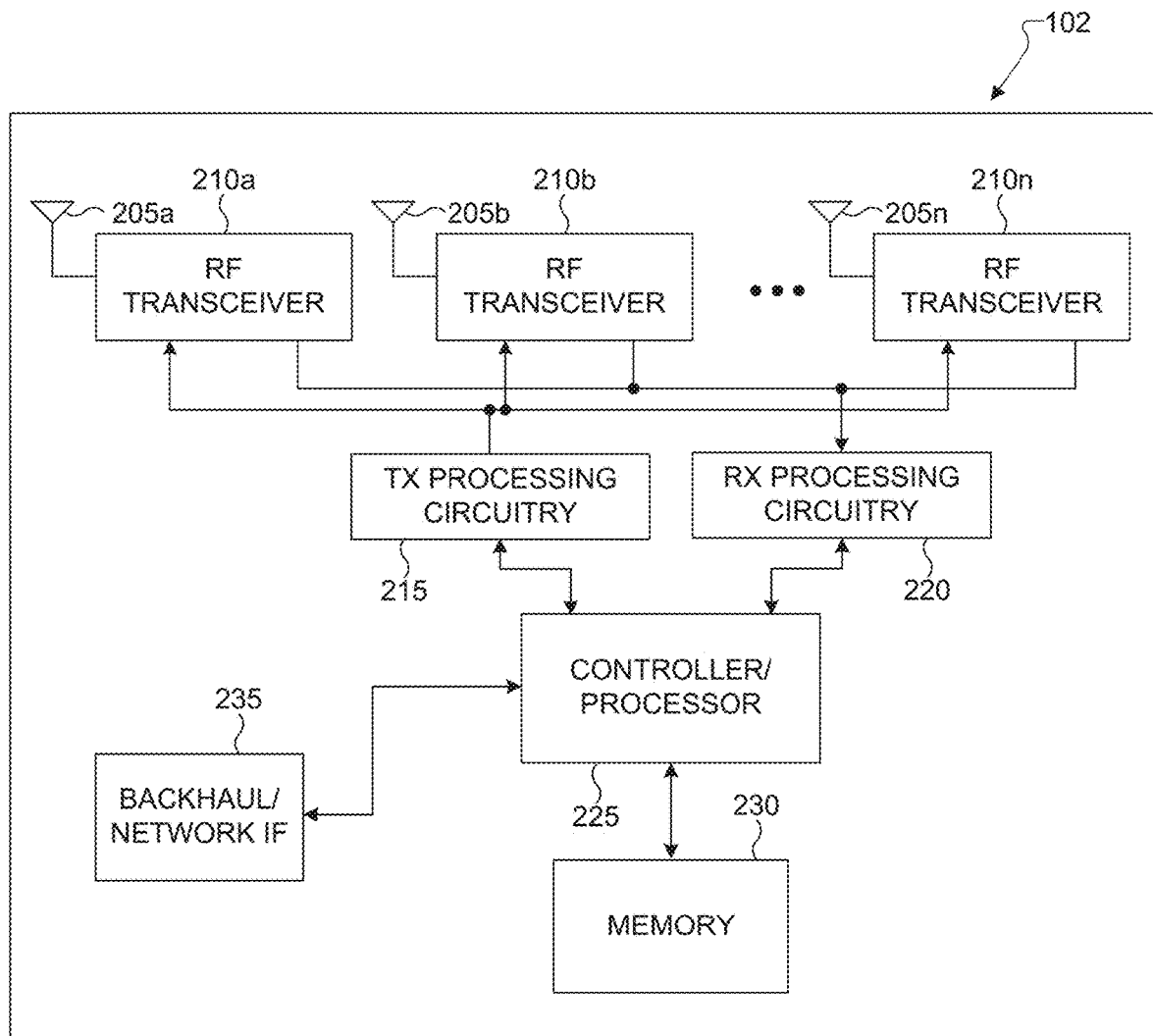
FIG. 2 illustrates an example gNB according to embodiments of the present disclosure.
Figure 3:
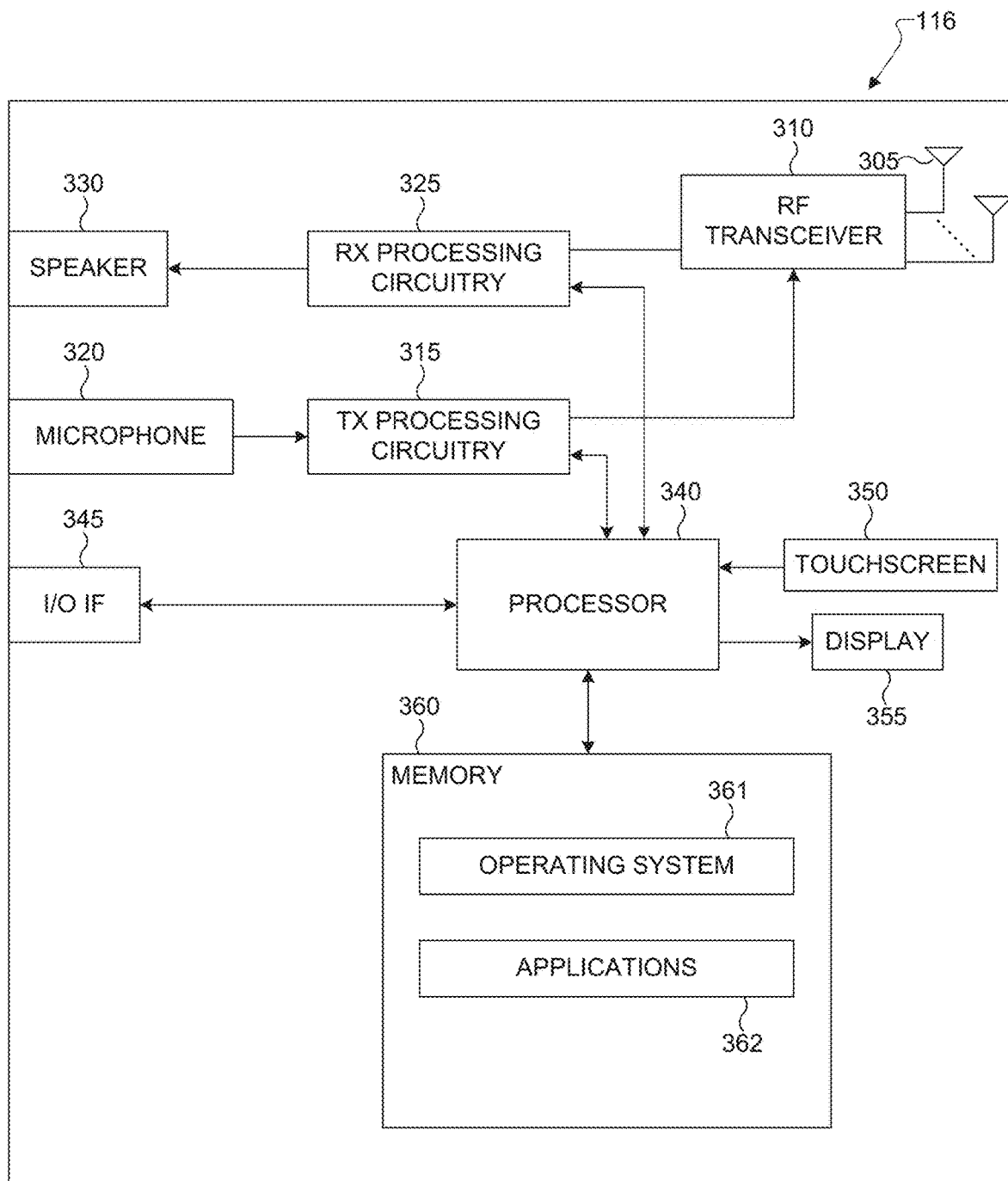
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" or 'gNB' can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS"/"gNB" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient signaling of control information in an advanced wireless communication system. In certain embodiments, and one or more of the gNBs 101-103 includes circuitry, programming, or a combination thereof, for efficient signaling of control information in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, efforts have been made to develop an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems. In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G/NR system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more slot symbols. A slot symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can have a BW of 180 KHz and include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol.

A gNB transmits one or more of multiple types of RS including channel state information RS (CSI-RS) and demodulation RS (DMRS). A CSI-RS is primarily intended for UEs to perform measurements and provide channel state information (CSI) to the gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling from a gNB. A DMRS is transmitted in the BW of a respective PDCCH or PDSCH and a UE can use the DMRS to demodulate data or control information.

Figure 4:
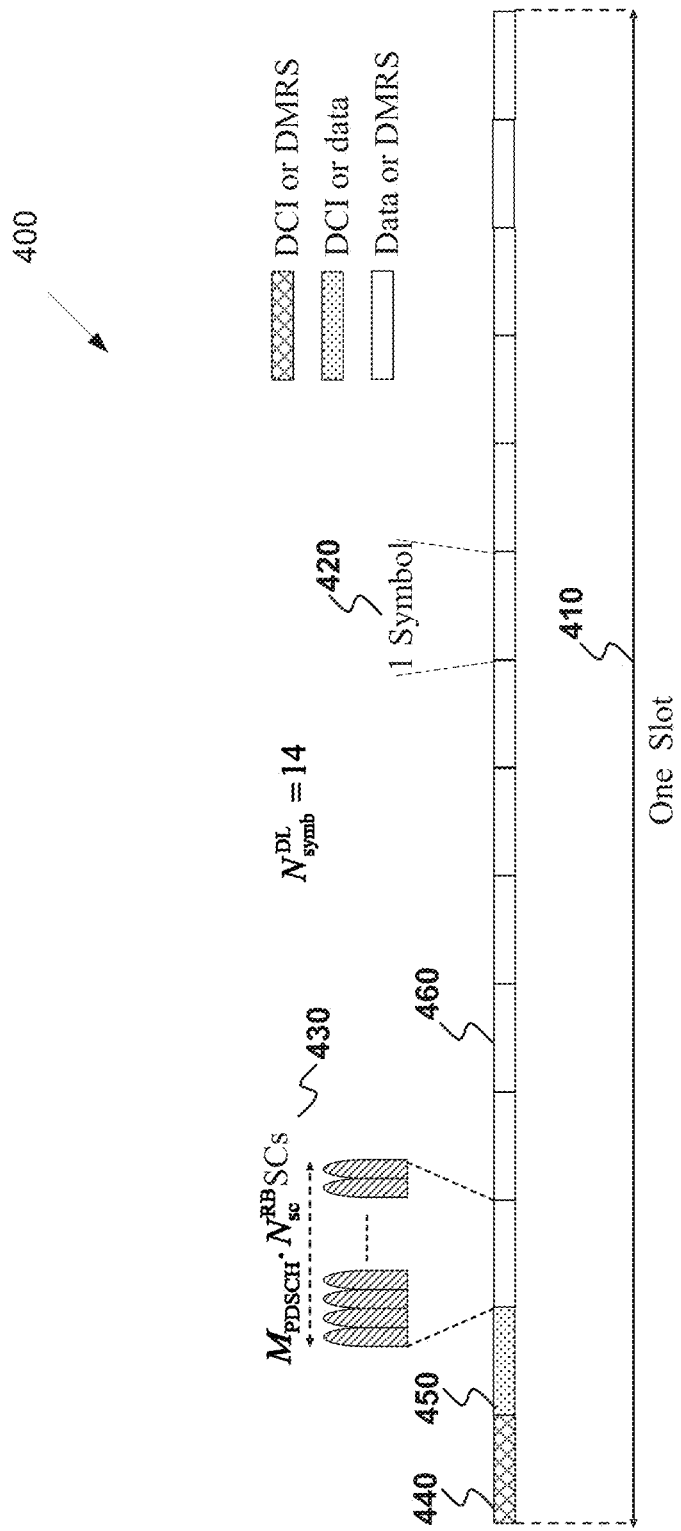
FIG. 4 illustrates an example DL slot structure according to embodiments of the present disclosure.

FIG. 4 illustrates an example DL slot structure 400 according to embodiments of the present disclosure. The embodiment of the DL slot structure 400 illustrated in FIG. 4 is for illustration only and could have the same or similar configuration. FIG. 4 does not limit the scope of this disclosure to any particular implementation.

A DL slot 410 includes $N_{symb}^{DL}$ symbols 420 where a gNB can transmit data information, DCI, or DMRS. A DL system BW includes $N_{RB}^{DL}$ RBs. Each RB includes $N_{sc}^{RB}$ SCs. A UE is assigned $M_{PDSCH}$ RBs for a total of $M_{sc}^{PDSCH} = M_{PDSCH} \cdot N_{sc}^{RB}$ SCs 430 for a PDSCH transmission BW. A PDCCH conveying DCI is transmitted over control channel elements (CCEs) that are substantially spread across the DL system BW. A first slot symbol 440 can be used by the gNB to transmit PDCCH. A second slot symbol 450 can be used by the gNB to transmit PDCCH or PDSCH. Remaining slot symbols 460 can be used by the gNB to transmit PDSCH and CSI-RS. In some slots, the gNB can also transmit synchronization signals and channels that convey system information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH and drop a PUCCH transmission.

UCI includes hybrid automatic repeat request acknowledgement (HARQ-ACK) information, indicating correct or incorrect detection of data transport blocks (TB s) in a PDSCH, scheduling request (SR) indicating whether a UE has data in the UE's buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH).

Figure 5:
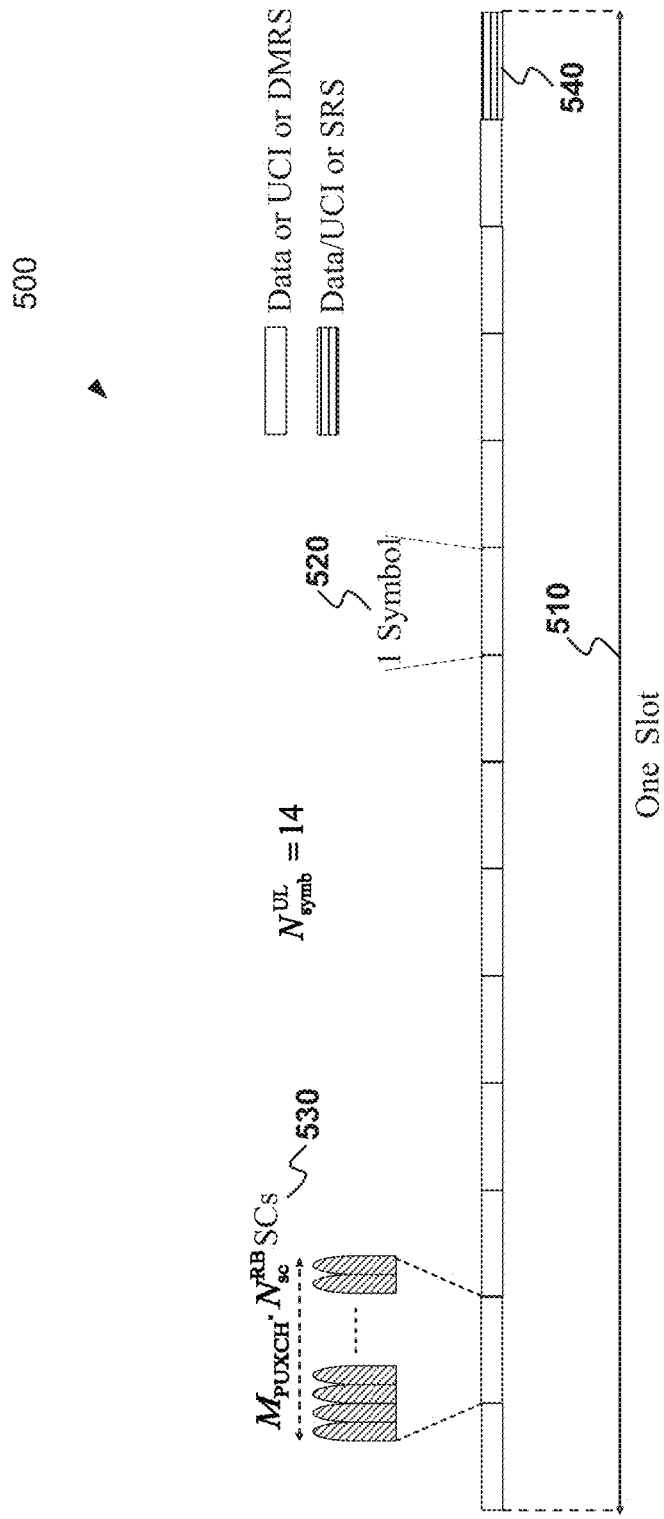
FIG. 5 illustrates an example UL slot structure for PUSCH transmission or PUCCH transmission according to embodiments of the present disclosure.

FIG. 5 illustrates an example UL slot structure 500 for PUSCH transmission or PUCCH transmission according to embodiments of the present disclosure. The embodiment of the UL slot structure 500 illustrated in FIG. 5 is for illustration only and could have the same or similar configuration. FIG. 5 does not limit the scope of this disclosure to any particular implementation.

As shown in FIG. 5, a slot 510 includes $N_{symb}^{UL}$ symbols 520 where UE transmits data information, UCI, or DMRS. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH} = M_{PUXCH} \cdot N_{sc}^{RB}$ SCs 530 for a PUSCH transmission BW ("X"="S") or for a PUCCH transmission BW ("X"="C"). Last one or more slot symbols can be used to multiplex SRS transmissions 550 or short PUCCH transmissions from one or more UEs.

A number of UL slot symbols available for data/UCI/DMRS transmission is $N_{symb}^{PUXCH} = 2 \cdot (N_{symb}^{UL} - 1) - N_{SRS}$, where $N_{SRS}$ is a number of slot symbols used for SRS transmission. Therefore, a number of total REs for a PUXCH transmission is $M_{sc}^{PUXCH} \cdot N_{symb}^{PUXCH}$. PUCCH transmission and PUSCH transmission can also occur in a same slot; for example, a UE can transmit PUSCH in the earlier slot symbols and PUCCH in the later slot symbols and then slot symbols used for PUCCH are not available for PUSCH and the reverse.

A hybrid slot includes a DL transmission region, a guard period region, and an UL transmission region, similar to a special subframe in LTE specification. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

DL transmissions and UL transmissions can be based on an orthogonal frequency division multiplexing (OFDM) waveform including a variant using DFT preceding that is known as DFT-spread-OFDM.

A UE typically monitors multiple candidate locations for respective potential PDCCH receptions to decode DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI), or variants of a C-RNTI such as a CS-RNTI or a MCS-C-RNTI, and serves as a UE identifier. For a DCI format scheduling a PDSCH conveying system information (SI), the RNTI can be an SI-RNTI. For a DCI format scheduling a PDSCH providing a random access response (RAR), the RNTI can be a RA-RNTI. For a DCI format providing TPC commands, the RNTI can be a TPC-PUSCH-RNTI, TPC-PUCCH-RNTI, or TPC-SRS-RNTI to respectively associate TPC command values with a transmission power of a PUSCH, PUCCH, or SRS. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

Figure 6:
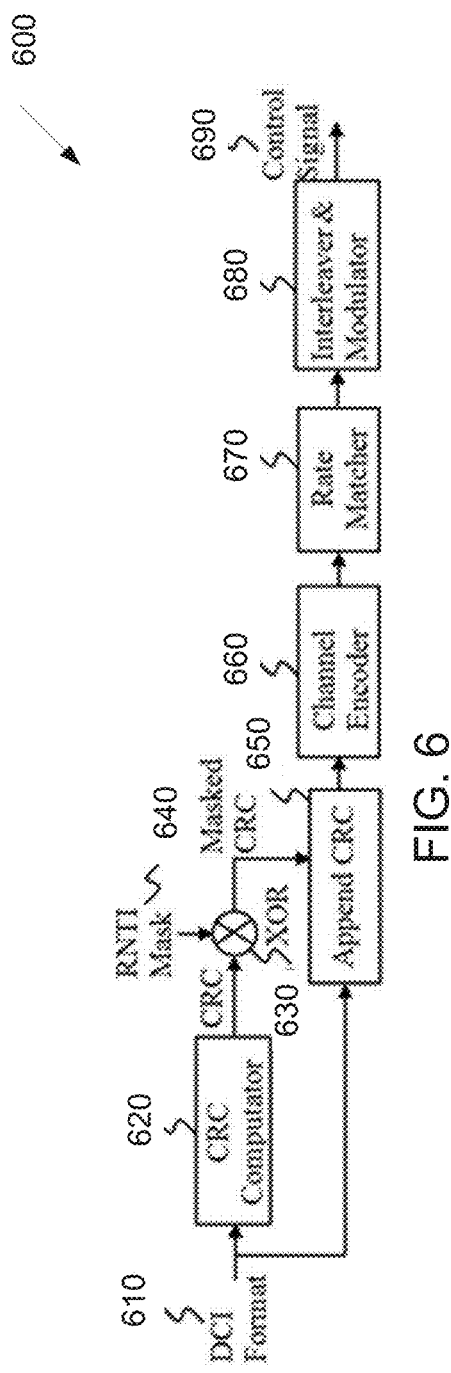
FIG. 6 illustrates an example encoding process for a DCI format according to embodiments of the present disclosure.

FIG. 6 illustrates an example encoding process 600 for DCI format according to embodiments of the present disclosure. An embodiment of the encoding process 600 for the DCI format shown in FIG. 6 is for illustration only. Other embodiments may be used without departing from the scope of the present disclosure.

A gNB separately encodes and transmits each DCI format in a respective PDCCH. A RNTI masks a CRC of the DCI format codeword in order to enable a UE to identify the DCI format. For example, the CRC and the RNTI can include 16 bits. The CRC of (non-coded) DCI format bits 610 is determined using a CRC computation unit 620, and the CRC is masked using an exclusive OR (XOR) operation unit 8630 between CRC bits and RNTI bits 640. The XOR operation is defined as XOR(0,0)=0, XOR(0,1)=1, XOR(1,0)=1, XOR(1,1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
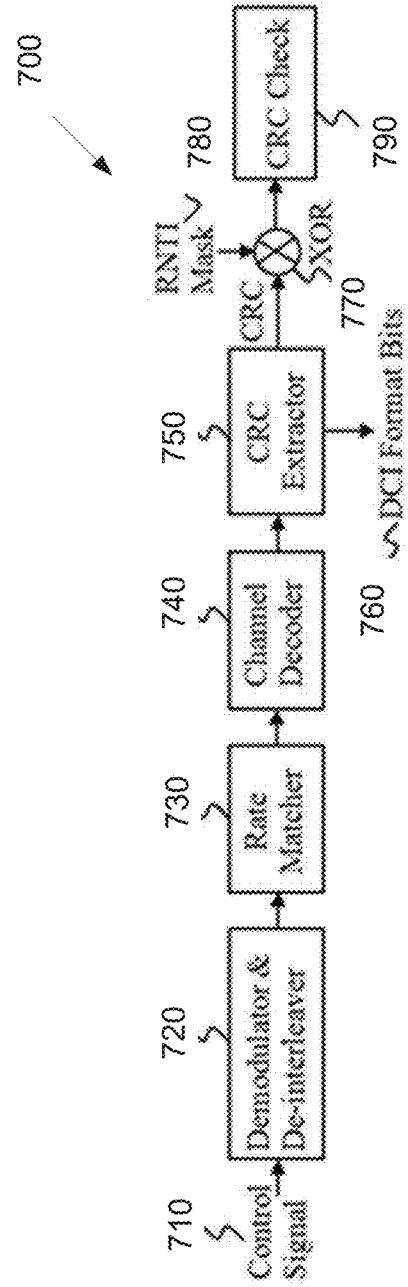
FIG. 7 illustrates an example decoding process for a DCI format for use with a UE according to embodiments of the present disclosure.

FIG. 7 illustrates an example reception and decoding process 700 for a DCI format for use with a UE according to embodiments of the present disclosure. An embodiment of the decoding process 700 for the DCI format for use with the UE shown in FIG. 7 is for illustration only. Other embodiments may be used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with a RNTI 780 (when applicable) and a CRC check is performed by unit 790. When the CRC check succeeds (check-sum is zero), the DCI format information bits are considered to be valid. When the CRC check does not succeed, the DCI format information bits are considered to be invalid.

A UE can transmit HARQ-ACK in a PUCCH or in a PUSCH that corresponds to multiple PDSCH receptions by the UE. The UE can determine a HARQ-ACK information payload that corresponds either to all non-overlapping PDSCH receptions that the UE can transmit respective HARQ-ACK information in a same PUSCH or PUCCH (semi-static HARQ-ACK codebook) or based on DL assignment indicator (DAI) fields that are included in a DCI format scheduling a PDSCH reception to the UE or in a DCI format scheduling a PUSCH transmission from the UE (dynamic HARQ-ACK codebook). When a UE has multiple scheduled PUSCH transmissions, it is beneficial for a reception reliability of HARQ-ACK information or data information to provide means for a UE to determine one of the PUSCH transmissions to multiplex HARQ-ACK information or, in general, UCI.

When a UE transmits HARQ-ACK bits in a PUSCH, the UE determines a number of coded modulation symbols per layer Q' for HARQ-ACK as in equation 1.

equation 1
$$Q'_{ACK} = \min\left\{ \left\lceil \frac{(O_{ACK} + L) \cdot M_{sc}^{PUSCH} \cdot N_{symb}^{PUSCH} \cdot \beta_{offset}^{PUSCH}}{\sum_{r=0}^{C_{UL-SCH}-1} K_r} \right\rceil, \sum_{l=0}^{N_{symb,all}^{PUSCH}-1} M_{sc}^{\Phi^{UCI}}(l) \right\}$$

where $O_{ACK}$ is the number of HARQ-ACK bits; L is the number of CRC bits, if any; $M_{sc}^{PUSCH}$ is the scheduled bandwidth of the PUSCH transmission, expressed as a number of subcarriers; $N_{symb}^{PUSCH}$ is the number of symbols of the PUSCH transmission, excluding all symbols used for DMRS; $\beta_{offset}^{PUSCH} = \beta_{offset}^{HARQ-ACK}$; $C_{UL-SCH}$ is a number of code blocks for UL-SCH in the PUSCH transmission; $K_r$ is the r-th code block size for UL-SCH in the PUSCH transmission; $M_{sc}^{PT-RS}$ is the number of subcarriers in a symbol that carries PTRS in the PUSCH transmission; $N_{symb}^{PTRS}$ is the number of symbols that carry PTRS, in the PUSCH transmission; $M_{sc}^{\Phi^{UCI}}(l) = |\Phi_l^{UCI}|$ is the number of elements in set $\Phi_l^{UCI}$, where $\Phi_l^{UCI}$ is the set of resource elements available for transmission of UCI in symbol l, for l=0, 1, 2, . . . , $N_{symb,all}^{PUSCH}-1$, and $N_{symb,all}^{PUSCH}$ is the total number of symbols of the PUSCH; and ⌈ ⌉ is the ceiling function that rounds a number to a next higher integer.

When a UE transmits CSI part 1 in a PUSCH, the UE determines a number of coded modulation symbols per layer $Q'_{CSI,1}$ as in equation 2.

equation 2
$$Q'_{CSI,1} = \min\left\{ \left\lceil \frac{(O_{CSI,1} + L) \cdot M_{sc}^{PUSCH} \cdot N_{symb}^{PUSCH} \cdot \beta_{offset}^{PUSCH}}{\sum_{r=0}^{C_{UL-SCH}-1} K_r} \right\rceil, \right.$$
$$\left. \left(\left\lceil \sum_{l=0}^{N_{symb,all}^{PUSCH}-1} M_{sc}^{\Phi^{UCI}}(l) \right\rceil - Q'_{ACK}\right) \right\}$$

where $O_{CSI,1}$ is the number of bits for CSI part 1; L is the number of CRC bits, when any, for coding of CSI part 1; $\beta_{offset}^{PUSCH} = \beta_{offset}^{CSI-part1}$; and $Q'_{ACK}$ is the number of coded modulation symbols per layer for HARQ-ACK transmitted on the PUSCH if number of HARQ-ACK information bits is more than 2, and $$Q'_{ACK} = \sum_{l=0}^{N_{symb,all}^{PUSCH}-1} \overline{M}_{sc,rvd}^{\Phi}(l)$$

if the number of HARQ-ACK information bits is 1 or 2 bits, where $\overline{\Phi}_l^{rvd}$ is the set of reserved resource elements for potential HARQ-ACK transmission in symbol l, for l=0, 1, 2, . . . , $N_{symb,all}^{PUSCH}-1$ and $\overline{M}_{sc,rvd}^{\Phi}(l)=|\overline{\Phi}_l^{rvd}|$ is the number of elements in $\overline{\Phi}_l^{rvd}$. Remaining notation is similar to the one described for HARQ-ACK and is not described for brevity.

When a UE transmits CSI part 2 in a PUSCH, the UE determines a number of coded modulation symbols per layer $Q'_{CSI,1}$ as in equation 3.

$$Q'_{CSI,2} = \min\left\{\left\lceil\frac{(O_{CSI,2}+L)\cdot M_{sc}^{PUSCH}\cdot N_{symb}^{PUSCH}\cdot \beta_{offset}^{PUSCH}}{\sum_{r=0}^{C_{UL-SCH}-1} K_r}\right\rceil,\right.$$
$$\left.\left(\left(\sum_{l=0}^{N_{symb,all}^{PUSCH}-1} M_{sc}^{\Phi^{UCI}}(l)\right) - Q'_{ACK} - Q'_{CSI,1}\right)\right\}$$

equation 3 where $O_{CSI,2}$ is the number of bits for CSI part 2, if any; L is the number of CRC bits for CSI part 2 coding; $\beta_{offset}^{PUSCH}=\beta_{offset}^{CSI-part2}$; $Q'_{ACK}$ is the number of coded modulation symbols per layer for HARQ-ACK transmitted on the PUSCH if number of HARQ-ACK information bits is more than 2, and $O'_{ACK}=0$ if the number of HARQ-ACK information bits is 1 or 2 bits; and $Q'_{CSI,1}$ is the number of coded modulation symbols per layer for CSI part 1 transmitted on the PUSCH. Remaining notation is similar to the one described for HARQ-ACK and is not described for brevity.

For UCI multiplexing in a PUSCH, HARQ-ACK coded modulation symbols puncture data coded modulation symbols or CSI part 2 coded modulation symbols when the HARQ-ACK payload is 1 or 2 bits and are rate matched with data coded modulation symbols or with CSI part 2 coded modulation symbols, respectively, when the HARQ-ACK payload is more than 2 bits. A set $\overline{\Phi}_l^{rvd}$ of REs are reserved in symbol l for potential HARQ-ACK transmission.

A PUSCH transmission can convey only A-CSI, and can also include HARQ-ACK, without including any UL-SCH data information. When a UE multiplexes only UCI (without UL-SCH data information) in a PUSCH transmission and the UE also transmits HARQ-ACK information bits, the UE determines a number of coded symbols Q' for HARQ-ACK as in equation 4 where $\beta_{offset}^{PUSCH}=\beta_{offset}^{HARQ-ACK}/\beta_{offset}^{CSI-part1}$ and the remaining of the notation is as previously described:

$$Q'_{ACK} = \min\left\{\left\lceil\frac{(O_{ACK}+L)\cdot M_{sc}^{PUSCH}\cdot N_{symb}^{PUSCH}\cdot \beta_{offset}^{PUSCH}}{O_{CSI,1}}\right\rceil,\right.$$
$$\left.\sum_{l=0}^{N_{symb,all}^{PUSCH}-1} M_{sc}^{\Phi^{UCI}}(l)\right\}$$

equation 4

A determination of a number of coded modulation symbols for a UCI type per layer Q' is based on a single respective $\beta_{offset}^{PUSCH}$ that a gNB configures to a UE either by higher layer signaling or indicates to a UE with a field in a DCI format scheduling the PUSCH transmission from a set of predetermined $\beta_{offset}^{PUSCH}$ values such as for example with a field of 2 bits indicating one out of four predetermined $\beta_{offset}^{PUSCH}$ values.

In case data information is not multiplexed in a PUSCH transmission, using equation 4 to derive a number of HARQ-ACK coded modulation symbols can result to a significant over-dimensioning as $O_{CSI,1}$ does not reflect the total CSI payload and, if a set of $\beta_{offset}^{HARQ-ACK}$ values that is provided by higher layers is used, for example according to the HARQ-ACK payload, the $\beta_{offset}^{HARQ-ACK}$ values can be significantly larger than necessary, for example by an order of magnitude, as $\beta_{offset}^{HARQ-ACK}$ values are typically selected for HARQ-ACK multiplexing in a PUSCH that includes data information and as a target BLER for data information is typically significantly larger than a target BLER for CSI. It is noted that for a given HARQ-ACK information target BLER, a $\beta_{offset}^{HARQ-ACK}$ value is typically inversely proportional to the target BLER of the information type (data or CSI) serving as reference for determining a number of HARQ-ACK coded modulation symbols.

Figure 8:
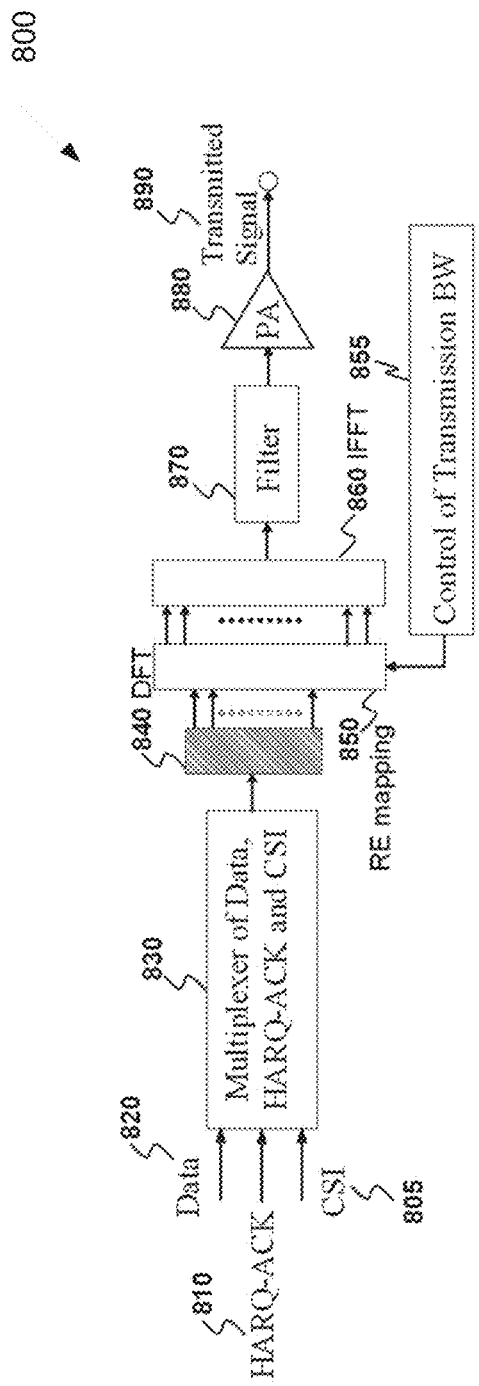
FIG. 8 illustrates an example transmitter block diagram for data information and UCI in a PUSCH according to embodiments of the present disclosure.

FIG. 8 illustrates an example transmitter block diagram 800 for data information and UCI in a PUSCH according to embodiments of the present disclosure. The embodiment of the transmitter block diagram 800 illustrated in FIG. 8 is for illustration only and could have the same or similar configuration. FIG. 8 does not limit the scope of this disclosure to any particular implementation.

Referring to FIG. 8, coded CSI information bits 805, when any, coded HARQ-ACK information bits 810, when any, and coded data information bits 820, when any, are multiplexed by multiplexer 830. Coded HARQ-ACK modulation symbols, when any, puncture data and/or CSI modulation symbols when a number of HARQ-ACK bits is less than 2 and are rate matched with data and/or CSI modulation symbols when a number of HARQ-ACK bits is more than 2. A number of HARQ-ACK or CSI coded modulation symbols can be determined by a processor (not shown), for example as in equation 1 through equation 3. When a DFT-S-OFDM waveform is used for transmission, a discrete Fourier transform (DFT) is applied by DFT unit 840 (no DFT is applied in case of an OFDM waveform), REs 850 corresponding to a PUSCH transmission BW are selected by selector 855, an IFFT is performed by IFFT unit 860, an output is filtered and by filter 870 and applied a certain power by power amplifier (PA) 880 and a signal is then transmitted 890. If any of data information, CSI, or HARQ-ACK information is not multiplexed, a block in FIG. 8 corresponding to a respective transmitter processing function is omitted. For brevity, additional transmitter circuitry such as digital-to-analog converter, filters, amplifiers, and transmitter antennas as well as encoders and modulators for data symbols and UCI symbols are omitted for brevity.

Figure 9:
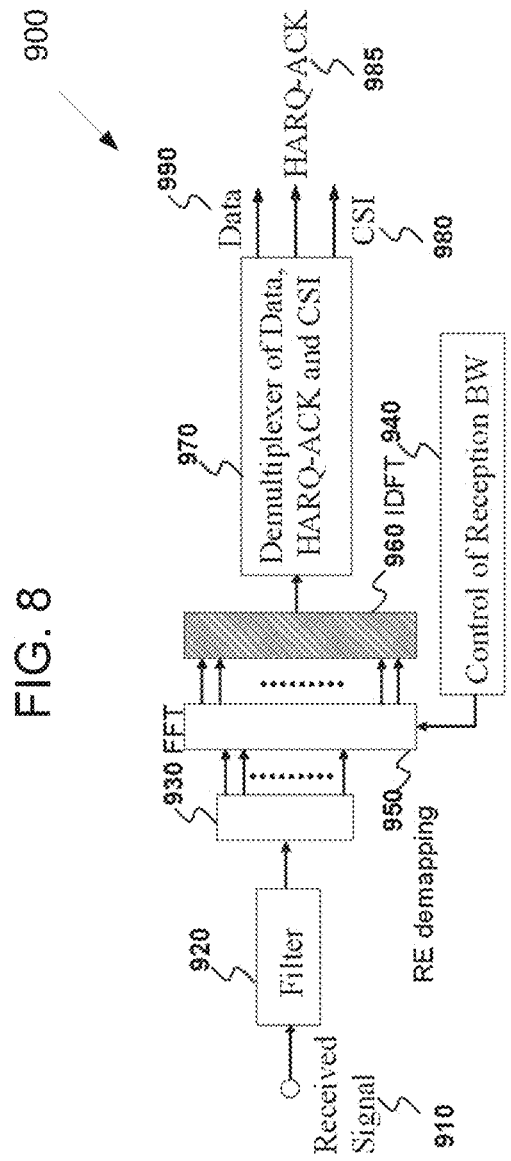
FIG. 9 illustrates an example receiver block diagram for data information and UCI in a PUSCH according to embodiments of the present disclosure.

FIG. 9 illustrates an example receiver block diagram 900 for data information and UCI in a PUSCH according to embodiments of the present disclosure. The embodiment of the receiver block diagram 900 illustrated in FIG. 9 is for illustration only and could have the same or similar configuration. FIG. 9 does not limit the scope of this disclosure to any particular implementation.

Referring to FIG. 9, a received signal 910 is filtered by filter 920, an FFT is applied by FFT unit 930, a selector unit 940 selects REs 950 used by a transmitter, an inverse DFT (IDFT) unit applies an IDFT 960 when a DFT-S-OFDM waveform is used for transmission, and a de-multiplexer 970 separates coded CSI information bits 980, if any, coded HARQ-ACK information bits, if any, 985 and coded data information bits, if any, 990 prior to providing them to respective decoders. A number of HARQ-ACK or CSI coded modulation symbols can be determined by a processor (not shown), for example as in equation 1 through equation 3. Additional receiver circuitry such as a channel estimator, demodulators and decoders for data and UCI symbols are not shown for brevity.

Transmitter and receiver structures for a PUCCH depend on a PUCCH format and can be similar to the ones for a PUSCH (without existence of data information). For example, for a first PUCCH format, transmitter and receiver structures can be as respective ones in FIG. 8 and FIG. 9 while for a second PUCCH format an orthogonal cover code can apply prior to the DFT filter in FIG. 8 or after the IDFT filer in FIG. 9. Corresponding descriptions are known in the art and are omitted for brevity.

When a UE transmits HARQ-ACK information in a PUCCH in response to PDSCH receptions scheduled by associated DCI formats, a corresponding PUCCH resource can be indicated by a PUCCH resource indicator field in each of the DCI formats. A PUCCH resource can include several parameters depending on a respective PUCCH format. For example, for a PUCCH transmission, a PUCCH resource can include an index of a first symbol in a slot, a number of symbols in the slot, and an index of a first RB before frequency hopping and, if applicable, an index of a first RB after frequency hopping.

To avoid increasing a number of bits for a PUCCH resource indicator field, an explicit PUCCH resource indication can be complemented with an implicit PUCCH resource indication. For example, when a UE is configured a set of four PUCCH resources, a PUCCH resource indicator field of 2 bits can be used to indicate a PUCCH resource from the set of four PUCCH resources and an implicit determination is not applicable while when a UE is configured a set of more than four PUCCH resources, a PUCCH resource indicator field of 2 bits can be used to indicate a sub-set from the set of PUCCH resources and an implicit determination for a PUCCH resource from the sub-set of PUCCH resources can additionally apply.

A PUCCH can be transmitted according to one from multiple PUCCH formats. A PUCCH format corresponds to a structure that is designed for a maximum number of symbols or for particular UCI payload range as different UCI payloads require different PUCCH transmission structures to improve an associated UCI BLER. A PUCCH transmission is also associated with a transmission configuration indicator (TCI) state providing a spatial domain filter for a PUCCH transmission.

One important characteristic of 5G networks is a flexibility provided for a number of UL symbols in a slot and a use of various sub-carrier spacing (SCS) values, such as 15 kilo-Hertz (kHz), 60 kHz, and so on. An existence of few UL symbols in a slot or a use of larger SCS values results to a reduced total received energy for a PUCCH transmission relative to a slot that includes only UL symbols or relative to a use of a smaller SCS value. To circumvent this problem and enable reliable receptions of PUCCH transmissions, a UE can be configured by higher layers a number of repetitions for a PUCCH transmission over a corresponding number of slots.

When a UE is not power limited, the UE can compensate for a reduced number of slot symbols for a PUCCH transmission or for a higher SCS by increasing a PUCCH transmission power. For example, in PUCCH transmission occasion i, a UE can determine a PUCCH transmission power $P_{PUCCH,b,f,c}(i,q_u,q_d,l)$ on an active UL BWP b of carrier f in a cell c using PUCCH power control adjustment state with index l as in equation 5

$$P_{PUCCH,b,f,c}(i, q_u, q_d, l) = \min\begin{Bmatrix} P_{CMAX,f,c}(i), \\ P_{O\_PUCCH,b,f,c}(q_u) + 10\log_{10}(2^\mu \cdot M_{RB,b,f,c}^{PUCCH}(i)) + PL_{b,f,c}(q_d) + \\ \Delta_{F\_PUCCH}(F) + \Delta_{TF,b,f,c}(i) + g_{b,f,c}(i, l) \end{Bmatrix} [\text{dBm}] \quad \text{equation 5}$$

where the corresponding parameters are described in 3GPP TS 38.213 v15.1.0, "NR, Physical Layer Procedures for Control", μ is the SCS configuration, and $\Delta_{TF,b,f,c}(i)$ is a PUCCH transmission power adjustment that accounts for a number of available resources for the PUCCH transmission during occasion i.

For PUCCH format 1, $$\Delta_{TF,b,f,c}(i) = 10\log_{10}\left(\frac{N_{ref}^{PUCCH}}{N_{symb}^{PUCCH}}\right),$$

where $N_{ref}^{PUCCH}=N_{symb}^{slot}$, $N_{symb}^{slot}$ is a number of symbols per slot, and $N_{symb}^{PUCCH}$ is a number of PUCCH transmission symbols in PUCCH transmission occasion i. For PUCCH format 3 or PUCCH format 4 and for $O_{UCI}=n_{HARQ-ACK}+O_{SR}+O_{CSI}\leq 11$ bits in PUCCH transmission occasion i, $\Delta_{TF,b,f,c}(i)=10\log_{10}(K_1\cdot(n_{HARQ-ACK}+O_{SR}+O_{CSI})/N_{RE})$, where $K_1=6$, $n_{HARQ-ACK}$ is a number of actual HARQ-ACK information bits that the UE determines as described in REF 3, $O_{SR}$ is a number of SR information bits, $O_{CSI}$ is a number of CSI information bits, and $N_{RE}$ is a number of REs for UCI transmission. For PUCCH format 3 or PUCCH format 4 and for $O_{UCI}=O_{HARQ-ACK}+O_{SR}+O_{CSI}>11$ bits in PUCCH transmission occasion i, $\Delta_{TF,b,f,c}(i)=10\log_{10}((2^{K_2\cdot BPRE}-1))$, $K_2=2.4$, $BPRE=(O_{ACK}+O_{SR}+O_{CSI}+O_{CRC})/N_{RE}$, and $O_{ACK}$ is a total number of HARQ-ACK information bits.

When a gNB determines that a UE cannot increase a transmission power to achieve a desired UCI reception reliability for a PUCCH transmission over a number of symbols of a slot, the gNB can configure the UE with a number of repetitions for a PUCCH transmission over a respective number of slots in order to increase a time for a PUCCH reception and increase a total PUCCH reception energy. As a required PUCCH transmission power depends on a number of UCI bits included in the PUCCH, a number of repetitions for a PUCCH transmission from a UE that cannot increase a PUCCH transmission power should depend on the number of UCI bits included in the PUCCH.

A PUCCH transmission with repetitions can include a single UCI type or multiple UCI types. Having a single UCI type and not multiplexing other UCI types in a PUCCH transmission, when corresponding PUCCH transmissions that would include the UCI types overlap in time, avoids having to increase a number of PUCCH repetitions to accommodate a larger UCI payload and therefore reduces a reception latency for the single UCI type at the expense of the UE dropping transmission of the other UCI types. Having multiple UCI types in a PUCCH transmission with repetitions has the reverse tradeoffs of having a single UCI type in a PUCCH transmission with repetitions and dropping the other UCIs.

Different UCI types can also have different reception reliability requirements. For example, a reception reliability for HARQ-ACK information can be 0.1% while a reception reliability for CSI can be 5%. Therefore, for a PUCCH transmission without repetitions, a PUCCH transmission power can depend on the UCI type while, for a PUCCH transmission with repetitions, a number of repetitions can depend on the UCI type.

Reception points at a gNB can dynamically change due to UE mobility or due variations in a corresponding channel medium. For example, a current beam for a PUCCH reception can become suboptimal and a new beam may not be immediately available thereby requiring a gNB to use a wider beam for a PUCCH reception and experience a reduced signal-to-noise and interference ratio (SINR) for the PUCCH reception. For example, a PUCCH can be dynamically received from one reception point or from multiple reception points and, in the latter case, a SINR for the PUCCH reception can increase. In order to enable a gNB to receive a UCI in a PUCCH with a desired reliability, the gNB can dynamically adjust a PUCCH transmission power from the UE. When the UE is power limited, it is beneficial for the gNB to be able to dynamically adjust a number of repetitions for a PUCCH transmission from the UE.

In addition to adjusting a power or a number of repetitions for a PUCCH transmission depending on a UCI payload, a UE may drop some of the UCI when a total UCI payload and a number of PUCCH REs available for UCI transmission result to a code rate that is larger than a code rate provided to the UE by higher layers. Then, the UE drops parts of UCI, such as part 2 CSI reports, until a resulting code rate is smaller than or equal to the code rate provided by higher layers. When it is not possible to further drop UCI, such as for example when the UE has dropped all CSI reports and the remaining UCI includes only HARQ-ACK information and the resulting code rate remains larger than the code rate provided by higher layers, the UE transmits the UCI with the resulting code rate. Instead of the UE dropping UCI or potentially having to transmit UCI with a code rate that is larger than a code rate provided by higher layers, it is beneficial to enable the UE to avoid dropping UCI or to enable the UE to transmit UCI with a code rate that is smaller than or equal to the code rate provided by higher layers.

Another important characteristic of 5G networks is a flexibility provided for a timing of UL transmissions. A UE can be indicated by a DCI format scheduling a PDSCH reception or a release of a semi-persistently scheduled (SPS) PDSCH, a slot for transmission of PUCCH conveying corresponding HARQ-ACK information. The UE can also be indicated a resource for the PUCCH transmission that includes a first symbol in the slot. Similar, a DCI format scheduling a PUSCH transmission can indicate a corresponding slot and a first symbol within the slot for the PUSCH transmission. The UE can also have periodic or semi-persistent PUSCH or PUCCH transmissions.

A UE may or may not be capable of simultaneously transmitting PUSCH and PUCCH in an UL bandwidth part (BWP) of a serving cell. When the UE is not capable of simultaneously transmitting PUSCH and PUCCH, the UE drops the PUCCH transmissions and multiplexes corresponding UCI, such as HARQ-ACK information or CSI, in a PUSCH transmission. Also, a UE may or may not be capable of simultaneously transmitting multiple PUCCHs in an UL bandwidth part (BWP) of a serving cell. When the UE is not capable of simultaneously transmitting multiple PUCCHs, the UE drops all PUCCH transmissions except one PUCCH transmission where the UE multiplexes all UCI. A UE is expected to perform the above functionalities when corresponding PUCCH or PUSCH transmissions start at a same symbol of a same slot. However, a UE is not generally capable of performing the above functionalities when corresponding PUCCH or PUSCH transmissions start at different symbols of a same slot. Moreover, under certain conditions that relate to a UE processing time, the UE may not be capable of performing the above functionalities even when corresponding PUCCH or PUSCH transmissions start at a same symbol of a same slot.

When a UE is not capable of multiplexing UCI from multiple PUCCH transmissions in a single PUCCH transmission or when the UE is not capable of multiplexing UCI in a PUSCH transmission, the UE needs to further determine a PUCCH transmission to prioritize (or, equivalently, the one or more PUCCH transmissions to drop) or whether to prioritize a PUSCH transmission or a PUCCH transmission.

Therefore, there is a need to provide an accurate determination for a number of HARQ-ACK coded modulation symbols in a PUSCH transmission that does not include data information.

There is another need to provide mechanisms for a determination of a PUSCH for multiplexing UCI in case of multiple PUSCH transmissions.

There is another need to provide mechanisms for implicit determination of a PUCCH resource in combination with an explicit determination of the PUCCH resource.

There is another need to determine an adjustment factor for a PUCCH transmission power depending on a corresponding number of UCI bits or on a corresponding type of UCI bits.

There is another need to define the UE behavior in terms of conditions for multiplexing UCI in a same PUCCH or PUSCH transmission or, when multiplexing is not possible, for dropping a number of PUSCH or PUCCH transmissions.

There is another need to define prioritization rules and a UE behavior for time-overlapped PUSCH or PUCCH transmissions.

There is another need to define a UE capability for a time a UE requires to cancel a configured transmission.

There is another need to adjust a number of repetitions for a PUCCH transmission based on a number of UCI bits conveyed by the PUCCH transmission.

There is another need to enable use of a different power or of a different number of repetitions for a PUCCH transmission depending on a UCI type included by the PUCCH transmission.

There is another need to dynamically indicate a number of repetitions for a PUCCH transmission.

Finally, there is another need to enable a UE to avoid dropping UCI or to avoid transmitting UCI with a code rate that is larger than a code rate provided to the UE by higher layers.

The present disclosure relates to a pre-5$^{th}$-Generation (5G) or 5G communication system to be provided for supporting higher data rates beyond 4$^{th}$-Generation (4G) communication system such as long term evolution (LTE). The present disclosure relates to providing an accurate determination for a number of HARQ-ACK coded modulation symbols in a PUSCH transmission that does not include data information. The present disclosure also relates to providing mechanisms for a determination of a PUSCH for multiplexing UCI in case of multiple PUSCH transmissions. The present disclosure additionally relates to providing mechanisms for implicit determination of a PUCCH resource in combination with an explicit determination of the PUCCH resource. The present disclosure further relates to determining an adjustment factor for a PUCCH transmission power depending on a corresponding number of UCI bits or on a corresponding type of UCI bits. The present disclosure also relates to defining a UE behavior in terms of conditions for multiplexing UCI in a same PUCCH or PUSCH transmission or, when multiplexing is not possible, for dropping a number of PUSCH or PUCCH transmissions. The present disclosure additionally relates to defining prioritization rules and a UE behavior for time-overlapped PUSCH or PUCCH transmissions. The present disclosure further relates to defining a UE capability for a time a UE requires to cancel a configured transmission. The present disclosure also relates to adjusting a number of repetitions for a PUCCH transmission based on a number of UCI bits conveyed by the PUCCH transmission. The present disclosure additionally relates to enabling use of a different power or of a different number of repetitions for a PUCCH transmission depending on a UCI type included by the PUCCH transmission. The present disclosure also relates to dynamically indicating a number of repetitions for a PUCCH transmission. Finally, the present disclosure relates to enabling a UE to avoid dropping UCI or to avoid transmitting UCI with a code rate that is larger than a code rate provided to the UE by higher layers.

A first embodiment of this disclosure considers a determination of a PUSCH for multiplexing HARQ-ACK from a UE when the UE transmits multiple PUSCH during a same slot.

In general, PUSCH transmissions can have different characteristics such as a different number of available resources for multiplexing data information and UCI, due to being transmitted over different corresponding number of RBs or number of slot symbols, or having different data MCS or spectral efficiency, or experiencing interference or channel mediums with different propagation characteristics.

Also, a PUSCH transmission can be scheduled by a DCI format and therefore have adaptive characteristics in associated parameters, such as MCS/spectral efficiency and total number of available REs, or can be configured by higher layers and have non-adaptive characteristics. Due to the dynamic nature of PUSCH transmissions on different cells or carriers, selecting a PUSCH for UCI multiplexing while maintaining desired target UCI reception reliability and minimizing an impact on data information reception reliability in the PUSCH cannot, in general, be based only predetermined rules and needs to be dynamically determined.

One predetermined rule can be that, when multiple PUSCH transmissions are available for HARQ-ACK, or in general UCI, multiplexing from a UE, the UE selects for HARQ-ACK multiplexing a PUSCH transmission scheduled by a DCI format PUSCH transmission that is configured by higher layers. Another predetermined rule can be that the UE selects for HARQ-ACK multiplexing a PUSCH transmission scheduled by a non-fallback DCI format over a PUSCH transmission scheduled by a fallback DCI format, where the non-fallback DCI format has larger size than the fallback DCI format, as the latter can be associated with a PUSCH transmission on a cell where the UE is experiencing deterioration in communication reliability with a gNB. For example, in 3GPP TS 38.212 v15.1.0, "NR, Multiplexing and Channel coding", DCI format 0_0 is a fallback DCI format and DCI format 0_1 is a non-fallback DCI format.

Further, a fallback DCI format does not include a beta_offset indicator field, as an existence of this field is configurable, when a non-fallback DCI format includes a beta_offset indicator field and then an adjustment of HARQ-ACK coded modulation symbols in a PUSCH transmission scheduled by a fallback DCI format is not as accurate as in a PUSCH transmission scheduled by a non-fallback DCI format. A fallback DCI format also not include a DAI field, further resulting to HARQ-ACK multiplexing in a corresponding PUSCH transmission being less reliable than in a PUSCH transmission scheduled by a no fallback DCI format. In such case, if HARQ-ACK multiplexing is in a PUSCH transmission scheduled by a fallback UL DCI format that does not include a DAI field, the UE can use the DAI field from the non-fallback DCI format to determine a HARQ-ACK codebook for multiplexing in the PUSCH transmission.

Figure 10:
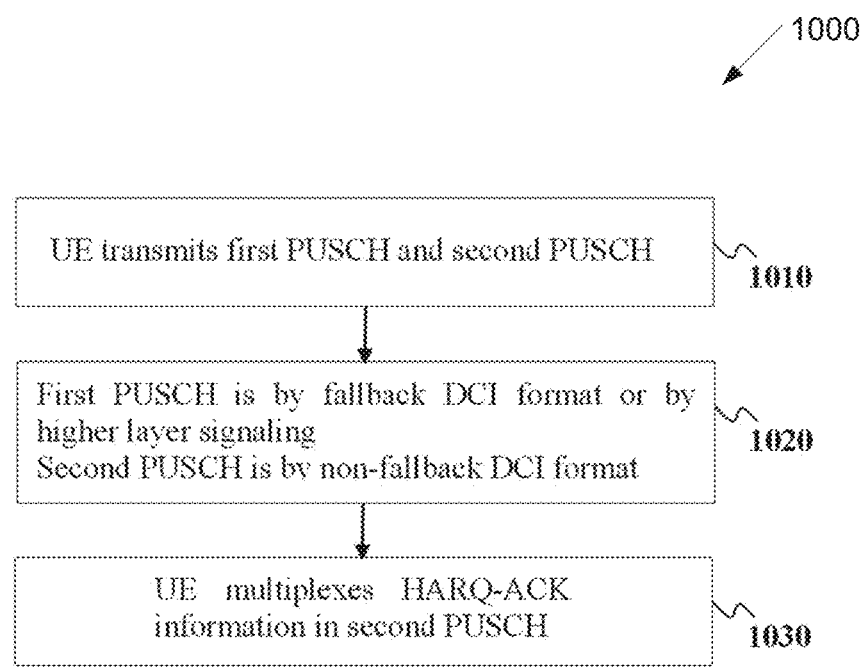
FIG. 10 illustrates a flow chart of a method for a determination of a PUSCH for multiplexing HARQ-ACK information according to embodiments of the present disclosure.

FIG. 10 illustrates a flow chart of a method 1000 for a determination of a PUSCH for multiplexing HARQ-ACK information according to embodiments of the present disclosure. The embodiment of the method 1000 illustrated in FIG. 10 is for illustration only and could have the same or similar configuration. FIG. 10 does not limit the scope of this disclosure to any particular implementation.

A UE is configured to transmit a first PUSCH and a second PUSCH and the UE has HARQ-ACK information to multiplex in a PUSCH 1010. The UE determines that the first PUSCH is scheduled by a fallback DCI format or by higher layer signaling and that the second PUSCH is scheduled by a non-fallback DCI format or by a DCI format, respectively, 1020. The UE multiplexes the HARQ-ACK information in the second PUSCH 1030.

Among PUSCH transmissions scheduled by respective non-fallback DCI formats, a PUSCH for HARQ-ACK multiplexing can be either explicitly indicated by respective DCI formats or implicitly determined based on characteristics of the PUSCH transmissions.

In a first approach, at least for non-fallback DCI formats, a DCI format can include a "HARQ-ACK_multiplexing" field of 1 bit indicating whether or not the UE may multiplex HARQ-ACK in an associated PUSCH transmission. For example, a binary "0" can indicate HARQ-ACK multiplexing. Having an explicit indication of the PUSCH used for HARQ-ACK multiplexing also enables a gNB receiver to avoid multiple decoding operations when a UE fails to detect a DCI format scheduling a PUSCH transmission where the gNB expects the UE to multiplex the HARQ-ACK, and then the UE multiplexes the HARQ-ACK in a different PUSCH that is not expected by the gNB, or avoid data buffer corruption when the gNB does not identify the PUSCH with HARQ-ACK multiplexing, for example, because a respective decoding fails or because the gNB does not perform multiple decoding operations for UCI in respective multiple PUSCH transmissions. When the UE does not detect a DCI format indicating HARQ-ACK multiplexing in a corresponding PUSCH transmission, the UE may transmit HARQ-ACK in a PUCCH or the UE may not transmit HARQ-ACK.

As an alternative to introducing a "HARQ-ACK_multiplexing" field, at least in a non-fallback DCI format scheduling a PUSCH transmission, one or more states of an A-CSI request field can be used to also indicate HARQ-ACK multiplexing in a corresponding PUSCH. For example, for an A-CSI request field of 2 bits, a value of "01" can be used to indicate both a corresponding configuration for an A-CSI report and HARQ-ACK multiplexing in a corresponding PUSCH. For example, any value of an A-CSI request field other than '00' can also indicate HARQ-ACK multiplexing in a corresponding PUSCH. For example, HARQ-ACK multiplexing can be in a PUSCH transmission indicated to not include data information.

In a second approach, at least for non-fallback DCI formats, when a DAI field is included in a DCI format scheduling a respective PUSCH transmission, the DAI field can be used to implicitly indicate the PUSCH for HARQ-ACK multiplexing. For example, a DAI field in a DCI format scheduling a PUSCH transmission where a scheduling gNB expects a UE to multiplex HARQ-ACK can have a first value while a DAI field in every other DCI format scheduling a PUSCH transmission where a scheduling gNB does not expect a UE to multiplex HARQ-ACK can have a second value, different from the first value. At least when the UE detects only two DCI formats scheduling respective PUSCH transmissions, the UE can determine the PUSCH transmission for multiplexing HARQ-ACK from the two DAI values in the two DCI formats and from the counter DAI or total DAI values in the DCI formats scheduling PDSCH receptions by the UE where the UE transmits the HARQ-ACK information in response to the PDSCH receptions (including a SPS PDSCH release).

For example, when a DAI field in a DCI format scheduling a PUSCH transmission from a UE is represented by 1 bit, the DAI field can equivalently act as a "HARQ-ACK_multiplexing" field by setting the value to, for example, "1" to indicate to a UE a PUSCH transmission for UCI multiplexing and to "0" to indicate to the UE a PUSCH transmission without UCI multiplexing. The UE can expect that the UE can detect DCI formats scheduling PUSCH transmissions in different cells during a same time period where the DAI field in one of the DCI formats is set to "1" and the DAI fields in every other of the DCI formats is set to "0" and the UE may not treat detection of such DCI formats as an error event. The UE may not expect to detect more than one DCI formats with an UL DAI field equal to "1" unless the UE is configured to multiplex UCI in multiple PUSCH transmissions.

For example, when a DAI field in a DCI format scheduling a PUSCH transmission from a UE is represented by 2 bits, DAI values in first and second DCI formats scheduling respective first and second PUSCH transmissions are "00" and "11" and the counter DAI in a last DCI format scheduling a PDSCH transmission that the UE detects is "00," the UE multiplexes HARQ-ACK in the first PUSCH transmission. For example, when DAI values in first and second DCI formats scheduling respective first and second PUSCH transmissions are "00" and "11" and the counter DAI in a last DCI format scheduling a PDSCH transmission that the UE detects is "10," the UE multiplexes HARQ-ACK in the second PUSCH transmission.

In general, a DAI value in a DCI format scheduling a PUSCH transmission where a UE is expected to multiplex HARQ-ACK information is the one with the smallest difference (modulo 4 for 2 DAI bits) relative to a counter DAI value in a last DCI format that the UE detects and schedules a PDSCH reception by the UE.

In order to increase a probability that a UE detects a DCI format scheduling a PUSCH transmission where the UE can multiplex HARQ-ACK information, a gNB can set a corresponding value for a HARQ-ACK_multiplexing field according to the first approach or a corresponding value of a DAI field according to the second approach to be same in more than one DCI formats.

A UE can select a PUSCH transmission, when more than one, for multiplexing HARQ-ACK information based on additional criteria such as multiplexing HARQ-ACK information in a PUSCH transmitted on a cell or carrier with the smallest index, or in a PUSCH transmission with the largest data MCS, or in a PUSCH resulting to a smaller ratio for the number of HARQ-ACK coded modulation symbols over the number of data information coded modulation symbols or over the number of available REs for transmission of data information and UCI.

A second embodiment of this disclosure considers a determination of a number of HARQ-ACK coded modulation symbols in a PUSCH that includes only UCI and does not include data information.

Using the formula of equation 4 can result to a significant over-dimensioning for a number of HARQ-ACK coded modulation symbols for at least two reasons. A first reason is that if only a number of CSI part 1 information bits, $O_{CSI,1}$, is considered as reference for determining a number of HARQ-ACK coded modulation symbols, this number is typically small such as about 10, and does not represent a total number of CSI bits as a number CSI part 2 information bits, $O_{CSI,2}$, can be significantly larger than $O_{CSI,1}$ or, equivalently, $O_{CSI,1}+O_{CSI,2}$ can be an order or magnitude or more larger than $O_{CSI,1}$. However, using $O_{CSI,1}+O_{CSI,2}$ instead of $O_{CSI,1}$ in equation 4 is not practically possible as a gNB does not know the $O_{CSI,2}$ value prior to decoding CSI part 1 and an incorrect determination can then lead to an incorrect determination for the number of HARQ-ACK coded modulation symbols and a respective incorrect decoding for the HARQ-ACK codeword at the gNB.

A second reason is that a configuration by higher layers of $\beta_{offset}^{HARQ-ACK}$, $\beta_{offset}^{CSI-part1}$, and $\beta_{offset}^{CSI-part2}$ values is typically with respect to the case that UL-SCH data information is also multiplexed in a respective PUSCH transmission. Then, for a target data information BLER that is about 10 times larger than a CSI BLER, using a same $\beta_{offset}^{HARQ-ACK}$ value in a PUSCH transmission with data information and in a PUSCH transmission without data information may result to an over-dimensioning for the number of HARQ-ACK coded modulation symbols by a factor of about 10.

In a first approach to enable a more accurate determination for a number of HARQ-ACK coded modulation symbols in a PUSCH transmission without UL-SCH data information is to replace $O_{CSI,1}$ in equation 4 with a reference CSI payload $O_{CSI,ref}$ resulting to $$Q'_{ACK} = \min\left\{\left\lceil\frac{(O_{ACK}+L)\cdot M_{sc}^{PUSCH}\cdot N_{symb}^{PUSCH}\cdot \beta_{offset}^{PUSCH}}{O_{CSI,ref}}\right\rceil, \sum_{l=0}^{N_{symb,all}^{PUSCH}-1} M_{sc}^{\Phi^{UCI}}(l)\right\}.$$

The reference CSI payload $O_{CSI,ref}$ can include the payload for CSI part 1 and a respective predetermined payload for CSI part 2. The reference CSI payload $O_{CSI,ref}$ can also include CRC bits used as part of the encoding process for CSI part 1 or CSI part 2. Even when the actual CSI part 2 payload is different than the predetermined one, a determination for the number of HARQ-ACK coded modulation symbols is more accurate than when using $O_{CSI,1}$ instead of $O_{CSI,ref}$.

In a second approach to enable a more accurate determination for a number of HARQ-ACK coded modulation symbols in a PUSCH transmission without UL-SCH data information is for a DCI format scheduling the PUSCH transmission from a UE to indicate a MCS/spectral efficiency for the CSI transmission. This can be achieved by including an information field of 1 bit ("data presence" field) that indicates whether or not the UE interprets the DCI format as scheduling transmissions of data information in addition to triggering a CSI report (indicated by a non-zero value of a 'CSI request' field) from the UE. When the information field does not indicate transmission of data information in the PUSCH, the MCS field in the DCI format indicates an MCS for the CSI transmission, $MCS_{CSI}$, where $MCS_{CSI} = Q_m \cdot R$, $Q_m$ is a modulation order and R is a target code rate determined from the MCS field in the DCI format. Then, a number of HARQ-ACK coded modulation symbols can be determined as $$Q'_{ACK} = \min\left\{\lceil (O_{ACK} + L) \cdot \beta_{offset}^{PUSCH} / MCS_{CSI} \rceil, \sum_{l=0}^{N_{symb,all}^{PUSCH}-1} M_{sc}^{\Phi^{UCI}}(l)\right\}.$$

Alternatively, a $O_{CSI}$ payload can be determined from the $MCS_{CSI}$ and the number of PUSCH REs available for UCI multiplexing in the PUSCH transmission (for example, excluding REs used for RS transmission).

In a third approach to enable a more accurate determination for a number of HARQ-ACK coded modulation symbols in a PUSCH transmission without UL-SCH data information is to provide separate configuration for two sets of $\beta_{offset}^{HARQ-ACK}$ values, a first set for the case that the UE multiplexes data information in a PUSCH transmission and a second set for the case that the UE does not multiplex data information in a PUSCH transmission. This can also be extended in case of separate coding for CSI part 1 or CSI part 2 and HARQ-ACK/SR in a PUCCH. For example, the $\beta_{offset}^{HARQ-ACK}$ values in the second set of values (that can correspond, for example to a respective set of HARQ-ACK payloads) can consider a target CSI BLER instead of a target data BLER and, for example, when the target CSI BLER is smaller than the target data information BLER, the target CSI BLER can have smaller values than the corresponding ones in the first set of $\beta_{offset}^{HARQ-ACK}$ values.

Further, the $\beta_{offset}^{HARQ-ACK}$ values in the second set of $\beta_{offset}^{HARQ-ACK}$ values can consider the payload of CSI part 1 as for the determination of the number of HARQ-ACK coded modulation symbols, as in equation 4, or can consider a reference CSI payload that can include corresponding ones for both CSI part 1, CSI part 2, and possibly CRC bits for the respective encoding processes.

In a fourth approach to enable a more accurate determination for a number of HARQ-ACK coded modulation symbols in a PUSCH transmission without UL-SCH data information is to apply a configuration of a code rate provided by higher layers and used by a UE to determine a number of REs (coded modulation symbols) for HARQ-ACK or CSI part 1 multiplexing in a PUCCH transmission using PUCCH format 3 or PUCCH format 4.

Joint coding for HARQ-ACK and CSI part 1 information bits can then apply for transmission in a PUSCH as for a transmission in the PUCCH (CSI part 2 information bits are separately coded). Otherwise, separate coding of HARQ-ACK information bits and CSI part 1 information bits can apply where a number of HARQ-ACK coded modulation symbols is determined as the minimum one resulting to a corresponding code rate for HARQ-ACK information bits that is smaller than or equal to a code rate provided by higher layers. A number of CSI part 1 coded modulation symbols is determined as the minimum between (a) the minimum number of CSI part 1 coded modulation symbols that result to a corresponding code rate for CSI part 1 bits that is smaller than or equal to a code rate provided by higher layers and (b) the number of CSI part 1 coded modulation symbols that can be multiplexed in available PUSCH REs after excluding REs used for multiplexing HARQ-ACK and REs used for RS transmission.

A third embodiment of this disclosure considers an association between a PUCCH resource indication to a UE and a determination by the UE of a set of parameters that the UE uses to compute a PUCCH transmission power.

An association between a PUCCH resource and a set of parameters a UE uses to compute a PUCCH transmission power can be based on a mapping between a set of $Q_d$ SS/PBCH block indexes or CSI-RS resource configurations for path-loss measurements, as in equation 5, and a set of $Q_p$ PUCCH spatial settings that correspond to SS/PBCH block indexes or CSI-RS resource configurations from the set $Q_d$. The mapping can be provided by higher layers.

When $Q_p < Q_d$, the mapping can be based on a sub-set of the set with the $Q_d$ SS/PBCH block indexes or CSI-RS resource configurations. For example, the set $Q_d$ can include 4 SS/PBCH block indexes and 8 CSI-RS resource configurations and the set $Q_p$ can include 2 of the 4 SS/PBCH block indexes and 2 of the 8 CSI-RS resource configurations.

Based on a PUCCH resource indicator field value in a DCI format, possibly complemented by implicit means as previously described, a UE can derive a PUCCH resource and obtain a setting for a spatial filter for the PUCCH transmission as a parameter of the PUCCH resource and thus obtain a SS/PBCH block index or with a CSI-RS resource configuration corresponding to a path-loss measurement that the UE then applies to determine a PUCCH transmission power, for example as in equation 5.

In order to mitigate an impact from potential error cases from an implicit PUCCH resource determination, when applicable in addition to an explicit indication of a subset of PUCCH resources by a PUCCH resource indication field, a PUCCH spatial setting can be same for all PUCCH resources in a subset of PUCCH resources indicated by the PUCCH resource indication field. Then, $Q_p$ can have a size equal to a number of PUCCH resource subsets that can be indicated by a PUCCH resource indication field in a DCI format.

A UE can also be provided by higher layers a mapping between a set of SRS resources and a set of SS/PBCH indexes or CSI-RS resource configurations for obtaining a path-loss estimate. When a DCI format scheduling a PDSCH reception to the UE includes a SRS resource indicator (SRI) field having a value that indicates a SRS resource from the set of SRS resources and the set of $Q_p$ PUCCH spatial settings also includes the SRS resource, the UE can use a path-loss corresponding to a SS/PBCH block or a CSI-RS resource configuration that is mapped to the SRS resource to determine a transmission power for a PUCCH conveying HARQ-ACK in response to the PDSCH reception.

Figure 11:
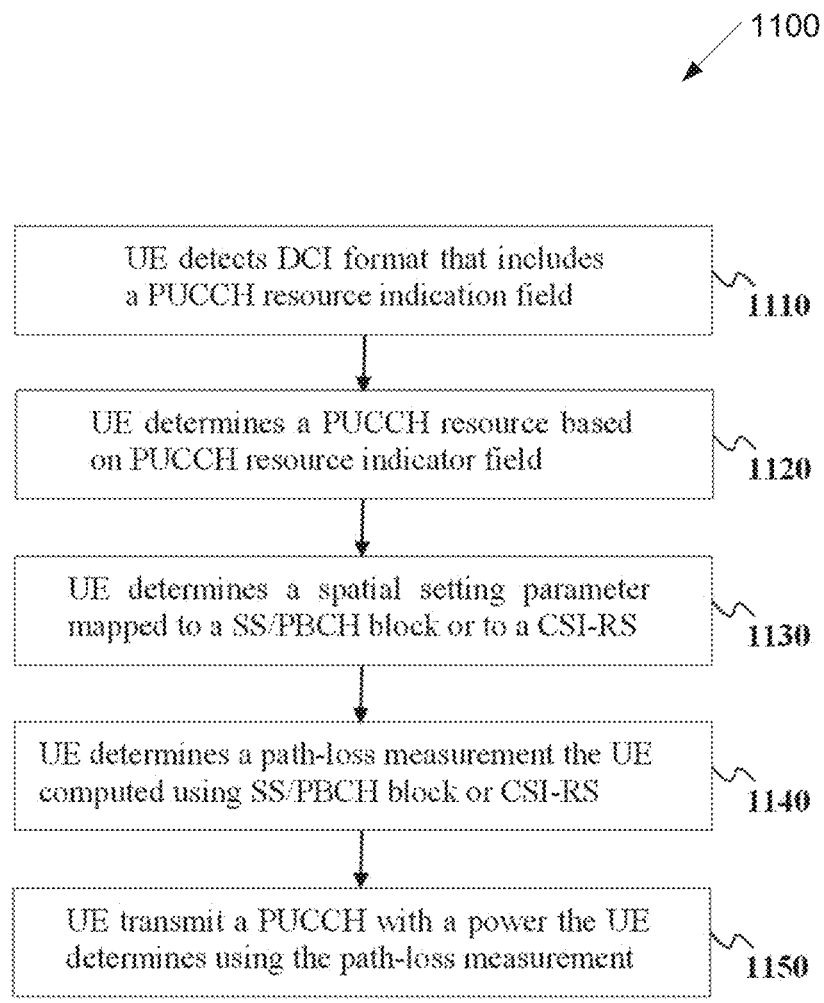
FIG. 11 illustrates a flow chart of a method for a determination by the UE of a PUCCH transmission power based on a spatial setting parameter for a PUCCH resource according to embodiments of the present disclosure.

FIG. 11 illustrates a flow chart of a method 1100 for a determination by the UE of a PUCCH transmission power based on a spatial setting parameter for a PUCCH resource according to embodiments of the present disclosure. The embodiment of the method 1100 illustrated in FIG. 11 is for illustration only and could have the same or similar configuration. FIG. 11 does not limit the scope of this disclosure to any particular implementation.

A UE detects a DCI format that schedules a PDSCH reception and includes a PUCCH resource indication field 1110. The DCI format can also include an SRI field. The UE determines a PUCCH resource based on the PUCCH resource indicator field 1120. The PUCCH resource determination can also be complemented by implicit means. The UE determines a PUCCH spatial setting parameter for the PUCCH resource that corresponds to an index of a SS/PBCH block or to a CSI-RS resource configuration 1130. The UE determines a path-loss measurement that the UE computed using the SS/PBCH block or the CSI-RS 1140.

The UE transmits a PUCCH with a power that the UE determines using the path-loss measurement 1150. When the DCI format indicates a SRS resource that is mapped by higher layer signaling to a SS/PBCH block index or a CSI-RS configuration the UE uses to measure a path-loss, the UE can use the corresponding path-loss to determine a PUCCH transmission power.

As a same PUCCH format can be used for transmission of different UCI types, such as HARQ-ACK or CSI, and as different UCI types can have different reception reliability targets, a set of parameters that a UE uses to determine a PUCCH transmission power for a same PUCCH format can be separately configured to the UE by higher layers depending on the UCI type. For example, a value for $P_{O\_PUCCH,f,c}(q_u)$ can be separately configured for HARQ-ACK transmission and for CSI transmission for a same PUCCH format.

When a UE multiplexes both HARQ-ACK and CSI in a same PUCCH, the UE can use the larger of the configured $P_{O\_PUCCH,f,c}(q_u)$ values in order to achieve the higher of the corresponding reception reliabilities for the UCI types. The other values for the set of PUCCH parameters can be same or can be separately configured.

A fourth embodiment of this disclosure considers the UE behavior in case of time-overlapped PUCCH transmissions or overlapped PUCCH and PUSCH transmission on a UL BWP of a serving cell and the determination of conditions for defining a UE behavior.

Partially overlapping PUCCH transmissions can generally occur for various combinations of UCI types. In practice, and for slot-based PUCCH transmissions, a gNB scheduler may not configure a UE with partially overlapping periodic PUCCH transmissions, especially if the UE may drop one of them due to the partial overlapping. The only non-periodic PUCCH transmission can be for HARQ-ACK. A slot and a first symbol for a PUCCH transmission is indicated by the DCI format triggering the HARQ-ACK transmission and, for PUCCH transmissions spanning at least 4 symbols in a slot, the UE typically knows the slot of the HARQ-ACK transmission at least from the previous slot.

If a UE has a configured PUCCH transmission for CSI in a same slot as a PUCCH transmission for HARQ-ACK and a first symbol for the former PUCCH transmission is same or after a first symbol for the latter PUCCH transmission, the UE can multiplex CSI in the latter PUCCH transmission. If the first symbol for the former PUCCH transmission is before the first symbol for the latter PUCCH transmission, CSI can again be multiplexed in the latter PUCCH transmission if there is sufficient time for the UE to cancel (the not yet ongoing) transmission of the former PUCCH.

In a first approach, a specific UE capability can be defined for a number of slot symbols required by a UE to cancel a PUCCH transmission that is configured by higher layers, such as a periodic or semi-persistent HARQ-ACK, SR, or CSI transmission in a PUCCH, or indicated by a DCI format such as a HARQ-ACK transmission indicated by a DCI format in a PUCCH. In a second approach, a UE capability for PUSCH preparation of $N_2$ symbols, can be considered as a loose bound for a time required to a UE to cancel a transmission.

If a time between a reception by a UE of a PDSCH scheduled by a DCI format triggering a HARQ-ACK transmission in a latter PUCCH and a first symbol of an earlier PUCCH is larger than $N_2$ symbols, the UE can cancel the earlier PUCCH transmission and multiplex CSI in the latter PUCCH transmission. Otherwise, the UE may not be assumed to be able to cancel the earlier PUCCH transmission and the UE may drop the latter PUCCH transmission. Also, the UE may treat this as an error case because the gNB may not be expected to trigger a PUCCH transmission for HARQ-ACK in a slot where the UE may drop the corresponding PUCCH transmission.

Figure 12:
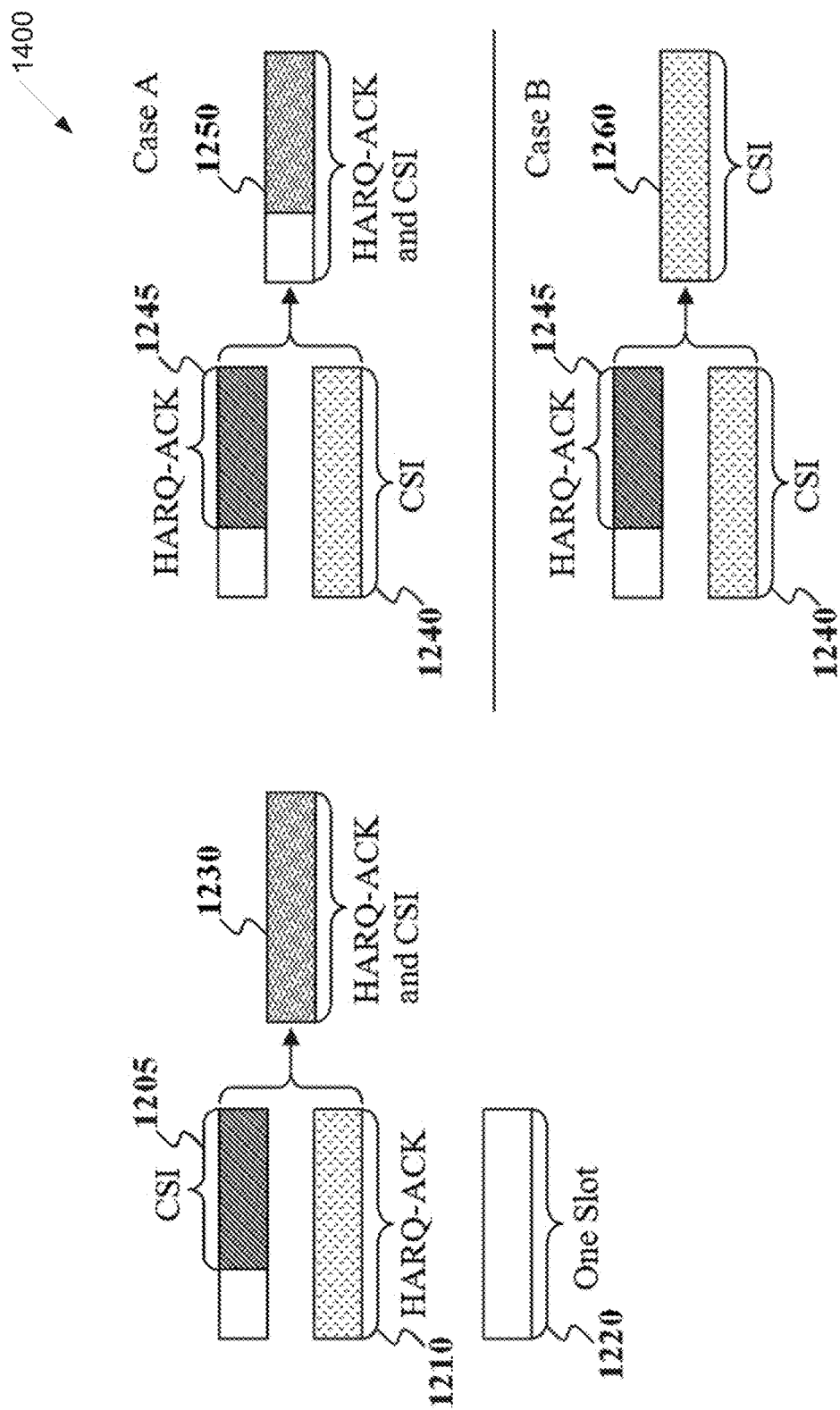
FIG. 12 illustrates an example UE behavior for multiplexing UCI from time-overlapped PUCCH transmissions in one of the PUCCH transmissions according to embodiments of the present disclosure.

FIG. 12 illustrates an example UE behavior 1200 for multiplexing UCI from time-overlapped PUCCH transmissions in one of the PUCCH transmissions according to embodiments of the present disclosure. The embodiment of the UE behavior 1200 illustrated in FIG. 12 is for illustration only and could have the same or similar configuration. FIG. 12 does not limit the scope of this disclosure to any particular implementation.

When a UE is configured a CSI transmission in a first PUCCH 1205 that starts later than a HARQ-ACK transmission in a second PUCCH 1210 (can be assumed to be indicated by a DCI format) in a same slot 1220, the UE multiplexes the CSI and HARQ-ACK in the second PUCCH transmission 1230 and drops the transmission of the first PUCCH. When a UE is configured a CSI transmission in a third PUCCH 1240 that starts earlier than a HARQ-ACK transmission in a fourth PUCCH 1245 (can be assumed to be indicated by a DCI format) in a same slot 1220, two cases are considered.

In a first case (Case A), a time between the time the UE receives/detects the DCI format indicating the fourth PUCCH transmission and the time the UE is configured to start the third PUCCH transmission is larger than or equal to a time required for a UE to cancel the third PUCCH transmission, such as for example larger than or equal to $N_2$ slot symbols. For this case (Case A), the UE drops the third PUCCH transmission and multiplexes CSI with HARQ-ACK in the fourth PUCCH transmission 1250. In a second case (Case B), a time between the time the UE receives/detects the DCI format indicating the fourth PUCCH transmission and the time the UE is configured to start the third PUCCH transmission is smaller than a time required for a UE to cancel the third PUCCH transmission, such as for example smaller than $N_2$ slot symbols. For this case (Case B), the UE drops the fourth PUCCH transmission and transmits only CSI in the third PUCCH transmission 1260. It is also possible for the UE to consider this case to be an error case, for example with respect to one or more DCI format detections indicating the fourth PUCCH transmission.

HARQ-ACK and SR multiplexing in a PUCCH can depend on when a positive SR request is provided from higher layers to the physical layer at the UE. However, HARQ-ACK and SR multiplexing can still be supported without consideration of the first slot symbol for corresponding PUCCH transmissions. The UE can transmit a negative SR if a positive SR request from higher layers is not provided to the physical layer early enough for the UE to be able to multiplex the positive SR (set the corresponding value of one or more SR bits) with the HARQ-ACK in the PUCCH transmission when the PUCCH transmission for HARQ-ACK starts before the PUCCH transmission for SR. The UE can transmit the positive SR at the next SR transmission occasion in a PUCCH.

Therefore, for slot-based PUCCH transmissions (i.e. excluding PUCCH transmission for SR with periodicity smaller than one slot), a UE can support or not support HARQ-ACK and CSI or SR multiplexing in a PUCCH without consideration for the first slot symbol of the corresponding PUCCHs subject to potential error cases as previously described.

For non-slot (sub-slot) based PUCCH transmissions, such as ones for SR with transmission periodicity less than one slot, one possibility is for a UE to drop an ongoing PUCCH (or possibly PUSCH) transmission in order to transmit a PUCCH conveying SR. However, a minimum time, such as a time equal to a PUSCH preparation time or a time indicated by a UE capability for cancelling an ongoing transmission, is required for cancelling an ongoing transmission. This minimum time is larger than a few slot symbols (e.g. the minimum value for $N_2$ is 10 symbols for 15 KHz subcarrier spacing).

Nevertheless, a UE not transmitting SR when the UE has an ongoing PUCCH or PUSCH transmission is not a problem as the additional latency incurred for a positive SR transmission is not expected to have a material impact on the overall scheduling latency. For example, an average additional latency incurred for a UE from an inability to transmit a positive SR with sub-slot periodicity is at most half a slot and needs to be further conditioned on the UE having an ongoing PUCCH transmission (or a PUSCH transmission) in the slot. Even with a relatively large probability of 50% for the UE to be transmitting PUCCH with HARQ-ACK or PUSCH in a slot, the resulting additional latency is at most 0.25 slots or less which has marginal impact on the end-to-end latency (even for a 0.5 msec slot).

For a PUCCH transmission conveying HARQ-ACK with repetitions over multiple slots and a higher priority for HARQ-ACK than for data, a UE can disregard UL grants resulting to PUSCH transmissions in slots where the UE repeats a PUCCH transmission (the likely cause if a false CRC check as the gNB scheduler would otherwise have no reason to schedule PUSCH since the UE drops the PUSCH transmission). Also, the UE may not multiplex other UCI in the repetitions of the PUCCH transmission conveying HARQ-ACK as this may degrade the reception reliability (and $N_{PUCCH}^{repeat}$ is semi-statically configured). Also, the UE can disregard DL assignments indicating a respective HARQ-ACK transmission in a slot where the UE is transmitting a repetition (other than the first one) for a PUCCH conveying HARQ-ACK.

There are two issues associated with 5G features that may not allow direct re-use of the LTE functionality: potential for partial overlapping with PUSCH or other PUCCH transmissions with the PUSCH or the other PUCCH being earlier; and existence of an overlapping (grant-free) PUSCH transmission that requires low latency or existence of a positive SR transmission associated with a low latency service.

For the first issue, the UE can cancel the overlapping PUSCH transmission or the other PUCCH transmission. The case that the PUSCH or the other PUCCH starts prior to the first repetition of the PUCCH transmission with the HARQ-ACK and the UE cannot cancel the respective transmission can be considered to be an error (as there is no need to expect the gNB to indicate a slot where the UE cannot transmit the first PUCCH repetition).

The second issue is of no particular practical interest as a (coverage limited) UE requiring PUCCH repetitions are likely to require even more repetitions for PUSCH or for information types requiring higher reception reliability. Moreover, as previously discussed, a UE cannot immediately cancel an ongoing transmission. Therefore, UE and gNB operation need not be affected by dropped PUCCH repetitions and the gNB need not perform blind detection for whether or not a PUSCH or PUCCH is received in a slot as this can also be difficult to reliably determine for coverage limited UEs.

For multiplexing UCI in a PUSCH transmission, instead of a PUCCH transmission, support of dynamic PUSCH and PUCCH (with HARQ-ACK) transmission timings can result to several possible combinations for overlapping of PUSCH and PUCCH transmissions. Overlapping can generally require different handling depending on when the PUSCH or the PUCCH transmission was triggered. For simplicity, the following assume that a PUCCH is transmitted without repetitions.

If a UE does not detect a DCI format triggering a PUCCH transmission after a DCI format scheduling a PUSCH transmission in a same slot, the UE knows of a possible overlapping when the UE prepares the PUSCH (UE has the minimum PUSCH preparation time available to cancel the PUCCH transmission). The UE can therefore multiplex the HARQ-ACK in the PUSCH and drop the PUCCH regardless of the PUCCH/PUSCH overlapping type (same/different first symbol). In case the UE has multiple PUSCH transmissions in multiple UL BWPs or in multiple serving cells, the same rule can apply and the UE can multiplex the HARQ-ACK in a PUSCH.

If a UE detects a DCI format triggering a PUCCH transmission after a DCI format scheduling a PUSCH transmission in the same slot, there can be HARQ-ACK information that the UE cannot multiplex in the PUSCH (e.g. due to PDSCH being received after the PUSCH is triggered). Also, the UE PUSCH processing timeline would be reduced if the UE had to multiplex HARQ-ACK in the PUSCH. The UE can then transmit the earlier channel.

Therefore, if a UE does not detect a DCI format triggering a PUCCH transmission after a DCI format scheduling a PUSCH transmission in the same slot, the UE multiplexes HARQ-ACK in the PUSCH (and PUCCH is dropped). If a UE detects a DCI format triggering a PUCCH transmission after a DCI format scheduling a PUSCH transmission in the same slot, the UE drops the later transmission.

For overlapping between periodic PUCCH and dynamic PUSCH transmissions with different first symbols and with the periodic PUCCH transmission not occurring earlier than the PUSCH transmission, the UE drops the PUCCH.

For overlapping between periodic (RRC configured) PUCCH and dynamic (scheduled by a DCI format) PUSCH transmissions with different first symbols and with the periodic PUCCH transmission occurring earlier than the PUSCH transmission, the UE drops the PUCCH transmission and multiplexes the corresponding UCI in the PUSCH if a time between the time the UE receives/detects the DCI format scheduling the PUSCH transmission and the starting time of the PUCCH transmission (first symbol of the PUCCH transmission) is equal to or larger than the PUCCH cancellation time (can be indicated by the UE to the gNB or assumed to be same as a PUSCH preparation time). The UE can then cancel the PUCCH transmission. Also, a UE can consider as an error case the case that a time between a PDSCH reception associated with transmission of HARQ-ACK information in a PUCCH and a start of a PUSCH transmission the overlaps with the PUCCH transmission is smaller than the PUCCH cancellation time as the gNB may not be expected to schedule a PUSCH transmission that the UE may drop. The same rule applies when a UE has multiple simultaneous PUSCH transmissions.

Figure 13:
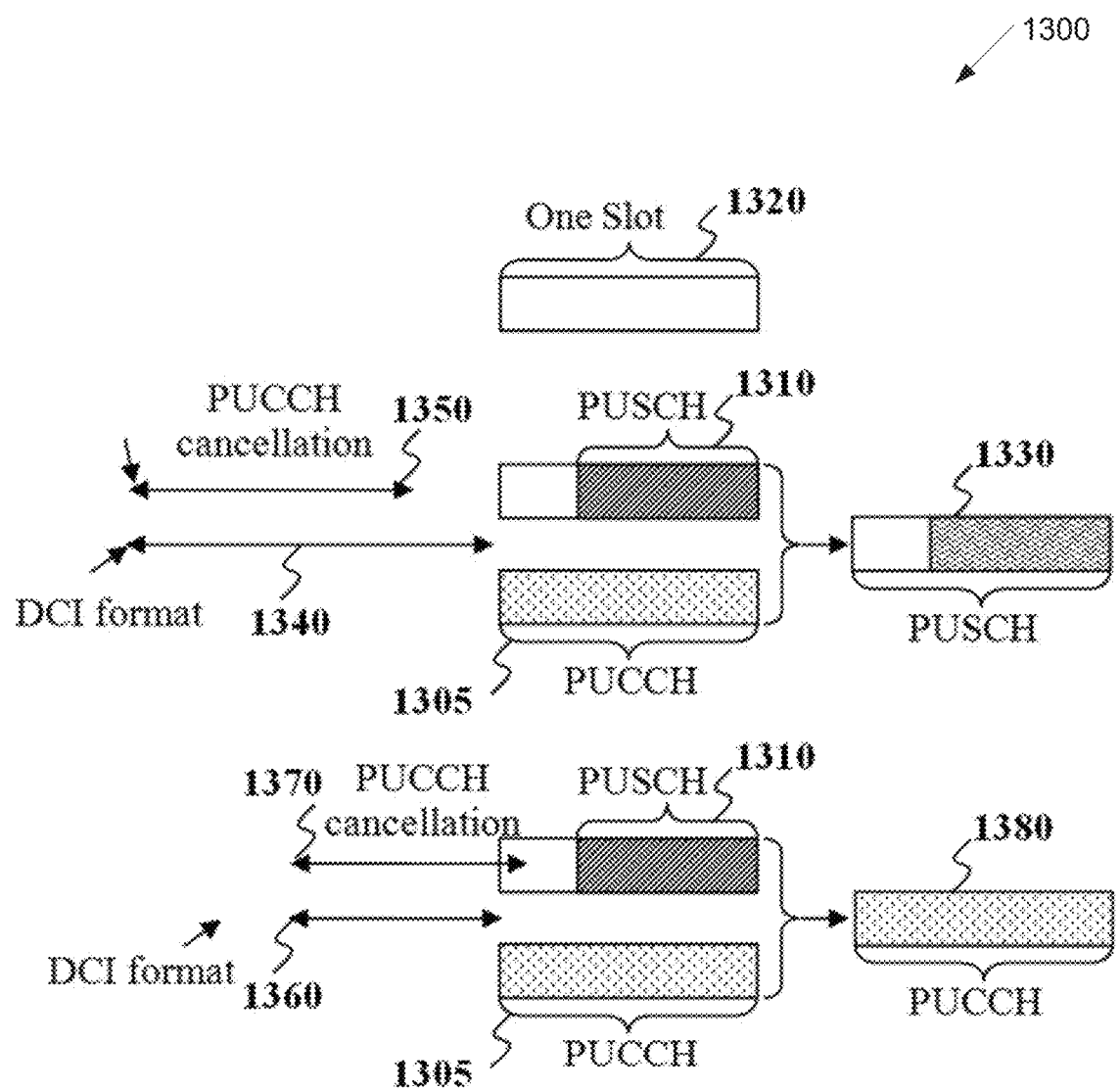
FIG. 13 illustrates an example UE behavior for multiplexing UCI from time-overlapped PUCCH and PUSCH transmissions in a PUSCH transmission according to embodiments of the present disclosure.

FIG. 13 illustrates an example UE behavior 1300 for multiplexing UCI from time-overlapped PUCCH and PUSCH transmissions in a PUSCH transmission according to embodiments of the present disclosure. The embodiment of the UE behavior 1300 illustrated in FIG. 13 is for illustration only and could have the same or similar configuration. FIG. 13 does not limit the scope of this disclosure to any particular implementation.

A periodic PUCCH transmission is considered but same principles apply for a PUCCH transmission triggered by a DCI format as is subsequently discussed. When a UE is configured a PUCCH transmission 1305 that starts earlier than an overlapping PUSCH transmission scheduled to the UE by a DCI format 1310 in a same slot 1320, the UE multiplexes the UCI of the periodic PUCCH transmission, such as CSI, in the PUSCH 1330 when a time between the time the UE receives/detects the DCI format scheduling the PUSCH transmission and the starting time of the PUCCH transmission (first symbol of the PUCCH transmission) 1340 is equal to or larger than the PUCCH cancellation time 1350.

Otherwise, when a time between the time the UE receives/detects the DCI format scheduling the PUSCH transmission and the starting time of the PUCCH transmission 1360 is smaller than the PUCCH cancellation time 1370, the UE drops the PUSCH transmission and transmits the UCI in the PUCCH 1380.

For a PUCCH transmission from a UE that conveys HARQ-ACK information and is triggered by a DL DCI format scheduling a corresponding PDSCH reception to the UE, the UE multiplexes HARQ-ACK in a PUSCH transmission that overlaps in time with the PUCCH transmission when a time between the time the UE receives the PDSCH and the time of the start of the PUSCH transmission is larger than or equal to the PUSCH preparation time. To provide additional time margin to the UE, another option is that the UE multiplexes HARQ-ACK in a PUSCH transmission that overlaps in time with the PUCCH transmission when a time between the time the UE completes a corresponding reception of transport blocks in a PDSCH scheduled by the DCI format and the time of the start of the PUSCH transmission is larger than or equal to the PUSCH preparation time.

A fifth embodiment of this disclosure considers a power adjustment for PUCCH transmission for small UCI payloads and a determination for a number of repetitions for a PUCCH transmission based on a number of UCI bits included in the PUCCH.

A gNB can provide, by higher layer signaling, to a UE a reference number of repetitions for a PUCCH transmission. The reference number of repetitions can correspond to a reference UCI payload (number of UCI information bits, including CRC bits if any). The reference UCI payload can be predetermined in a system operation, such as 1 UCI bit, or 2 UCI bits, or 4 UCI bits, or can be also provided by higher layer signaling. A number of repetitions can be separately provided to a UE for each UCI type, such as HARQ-ACK, SR, of CSI and the UE determines a number of repetitions for a PUCCH transmission based on the type of the UCI bits that are included in the PUCCH transmission.

A UE configured with repetitions for a PUCCH transmission can maintain a same PUCCH transmission power instead of, when possible, adjusting the PUCCH transmission power based on the UCI payload in the PUCCH as described in equation 5. A configuration for repetitions for a PUCCH transmission can also include a single transmission (no repetitions) for the reference UCI payload (and for UCI payloads smaller than the reference UCI payload). When the UE is provided by higher layers a configuration for a PUCCH transmission with repetitions, the UE can apply one or more repetitions for UCI payloads larger than the reference UCI payload even when the UE is indicated by higher layers no repetitions for a PUCCH transmission with the reference UCI payload.

For PUCCH format 1, the power control formula in equation 5 can be adjusted to include an additional term of $10 \log_{10} O_{UCI}$ dB to adjust for the UCI (HARQ-ACK/SR) payload depending on whether $O_{UCI}=1$ bit or $O_{UCI}=2$ bits. For example, in PUCCH transmission occasion $$\Delta_{TF,b,f,c}(i) = 10\log_{10}\left(\frac{N_{ref}^{PUCCH}}{N_{symb}^{PUCCH}}\right)$$

can be modified as $$\Delta_{TF,b,f,c}(i) = 10\log_{10}\left(\frac{N_{ref}^{PUCCH}}{N_{symb}^{PUCCH}}\right) + 10\log_{10}O_{UCI}.$$

For a configured number of PUCCH repetitions $N_{PUCCH}^{repeat}$ corresponding to a UCI reference payload of 1 bit, a UE may not be able to increase the PUCCH transmission power by $\Delta_{TF,b,f,c}(i) = 10 \log_{10}(K_1 \cdot O_{UCI}/N_{RE})$ when $2 < O_{UCI} \leq 11$, for example because the UE transmission power is already close to the maximum transmission. Instead, the UE increases a number of repetitions for the PUCCH transmission. For a PUCCH transmission that includes $O_{UCI}=2$ UCI bits, the UE can apply $2 \cdot N_{PUCCH}^{repeat}$ repetitions. For a PUCCH transmission that includes $2 < O_{UCI} \leq 11$ UCI bits, the UE can apply, for example, $\lceil N_{PUCCH}^{repeat} \cdot K_1 \cdot O_{UCI}/N_{RE} \rceil$ repetitions or $\lfloor N_{PUCCH}^{repeat} \cdot K_1 \cdot O_{UCI}/N_{RE} \rfloor$ repetitions. The UCI payload can correspond to a single UCI type, such as $n_{HARQ-ACK}$ HARQ-ACK information bits, or to multiple UCI types such as to $O_{SR}+O_{CSI}$ information bits.

UCI payloads that can be supported by a PUCCH transmission with repetitions can be limited, for example to at most $O_{UCI}=11$ bits, as UEs that transmit PUCCH in transmission occasion i with a power close to a maximum power $P_{CMAX,f,c}(i)$ are typically coverage limited and do not need to provide a large number of HARQ-ACK information bits or detailed CSI reports. For repetitions of a PUCCH transmission that includes $O_{UCI}>11$ bits, a number of repetitions can be determined, for example as $[(2^{K_2 \cdot BPRE}-1) \cdot N_{PUCCH}^{repeat}]$, where $K_2$=2.4 and BPRE=$(O_{ACK}+O_{SR}+O_{CSI}+O_{CRC})/N_{RE}$.

Figure 14:
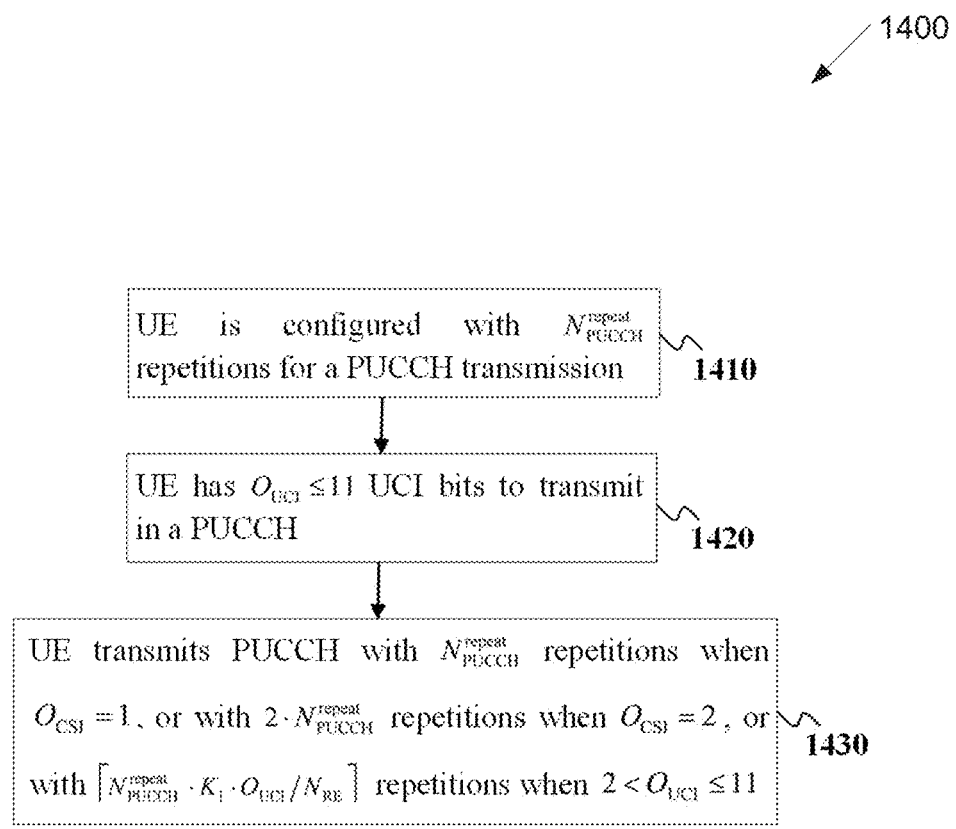
FIG. 14 illustrates a flow chart of a method for determination for a number of repetitions of a PUCCH transmission that includes a UCI payload, based on a number of repetitions provided by higher layers for a reference UCI payload according to embodiments of the present disclosure.

FIG. 14 illustrates a flow chart of a method 1400 for determination for a number of repetitions of a PUCCH transmission that includes a UCI payload, based on a number of repetitions provided by higher layers for a reference UCI payload according to embodiments of the present disclosure. The embodiment of the method 1400 illustrated in FIG. 14 is for illustration only and could have the same or similar configuration. FIG. 14 does not limit the scope of this disclosure to any particular implementation.

A UE is provided by higher layers a number of repetitions $N_{PUCCH}^{repeat}$ for a PUCCH transmission 1410. The UE can also be provided by higher layers a reference UCI payload for the $N_{PUCCH}^{repeat}$ repetitions or the reference UCI payload can be predetermined such as 1 bit. The UE has $O_{UCI} \leq 11$ UCI bits to transmit in a PUCCH in transmission occasion i where the UCI bits correspond to either $n_{HARQ-ACK}$ HARQ-ACK information bits, or to $O_{CSI}$ CSI bits, or to $O_{SR}+O_{CSI}$ SR and CSI bits, and so on 1420.

The UE transmits the PUCCH with $N_{PUCCH}^{repeat}$ repetitions when $n_{HARQ-ACK}=1$ (or when $O_{SR}=1$ if the UE transmits SR for a single SR configuration), or with $2 \cdot N_{PUCCH}^{repeat}$ repetitions when $n_{HARQ-ACK}=2$ (or when $O_{SR}=2$ if the UE transmits SR for one of four possible configurations), or with $\lceil N_{PUCCH}^{repeat} \cdot K_1 \cdot O_{UCI}/N_{RE} \rceil$ repetitions when $n_{HARQ-ACK}>2$, or when the UCI is CSI, or when the UE transmits SR for one of more than four possible configurations 1430.

A number of repetitions $N_{PUCCH}^{repeat}$ for a PUCCH transmission can also be relative to a reference payload of $O_{UCI}^{ref}>1$ UCI bits instead of 1 UCI bit ($N_{PUCCH}^{repeat}$ can be denoted as $N_{PUCCH}^{repeat}(O_{UCI}^{ref})$). The reference payload of $O_{UCI}^{ref}$ UCI bits can be predetermined in a system operation, such as $O_{UCI}^{ref}=1$ bit or $O_{UCI}^{ref}=11$ bits, or be provided to the UE by higher layer signalling. Then, a number of repetitions for a PUCCH transmission with payload of $O_{UCI}$ UCI bits can be smaller or larger than $N_{PUCCH}^{repeat}$ when $O_{UCI}$ is respectively smaller or larger than $O_{UCI}^{ref}$.

For example, if $O_{UCI}^{ref}>2$ and $O_{UCI}=1$ or $O_{UCI}=2$, a number of repetitions for a PUCCH transmission can be determined by adjusting for a difference in respective $\Delta_{TF,b,f,c}(i)$ components as $$N_{PUCCH}^{repeat}(O_{UCI}) = \left\lceil \frac{O_{UCI} \cdot N_{ref}^{PUCCH}/N_{symb}^{PUCCH}}{K_1 \cdot O_{UCI}^{ref}/N_{RE}} \cdot N_{PUCCH}^{repeat}(O_{UCI}^{ref}) \right\rceil.$$

For example, if $O_{UCI}^{ref}>2$ and $O_{UCI}>2$, a number of repetitions for a PUCCH transmission can be determined by adjusting for a difference in respective $\Delta_{TF,b,f,c}(i)$ components as $$N_{PUCCH}^{repeat}(O_{UCI}) = \left\lceil \frac{O_{UCI}}{O_{UCI}^{ref}} \cdot N_{PUCCH}^{repeat}(O_{UCI}^{ref}) \right\rceil.$$

For simplicity, $$N_{PUCCH}^{repeat}(O_{UCI}) = \left\lceil \frac{O_{UCI}}{O_{UCI}^{ref}} \cdot N_{PUCCH}^{repeat}(O_{UCI}^{ref}) \right\rceil$$

can apply to all UCI payloads up to 11 bits.

Instead of adjusting the number of repetitions according to a UCI payload of $O_{UCI}$ UCI bits (including $O_{CRC}$ CRC bits when $O_{UCI}>11$), a UE can adjust a PUCCH transmission power. This approach assumes that a number of repetitions for a PUCCH transmission, $N_{PUCCH}^{repeat}$, that is configured to the UE is with respect to a reference UCI payload $O_{UCI}^{ref}$. For example, when $O_{UCI} \leq O_{UCI}^{ref}$, a UE can transmit the PUCCH using $N_{PUCCH}^{repeat}$ repetitions while reducing the power by $10 \log_{10}(O_{UCI}^{ref}/O_{UCI})$ dB. For $O_{UCI}>O_{UCI}^{ref}$, the UE can determine a number of repetitions larger than $N_{PUCCH}^{repeat}$, for example as described in FIG. 14.

A value of $O_{UCI}^{ref}$ can be provided to the UE by a gNB using higher layer signalling or be predetermined in a system operation. For example, a value of $O_{UCI}^{ref}$ can be same as a maximum UCI payload that a UE can transmit an associated PUCCH with repetitions. For transmission of one or two HARQ-ACK information bits, a UE can reduce a transmission power by $\Delta_{TF\_adjust,b,f,c}(i)=10 \log_{10}(K_1 \cdot (n_{HARQ-ACK}+O_{SR}+O_{CSI})/N_{RE})-10 \log_{10}(N_{ref}^{PUCCH}/N_{symb}^{PUCCH})$ when $2 < O_{UCI}^{ref} \leq 11$ bits or by $\Delta_{TF\_adjust,b,f,c}(i)=10 \log_{10}((2^{K_2 \cdot BPRE}-1))-10 \log_{10}(N_{ref}^{PUCCH}/N_{symb}^{PUCCH})$ when $O_{UCI}^{ref}>11$ bits. For transmission of $2 < O_{UCI} \leq 11$ bits when $O_{UCI}^{ref}>11$, the UE can adjust a PUCCH transmission power (while using $N_{PUCCH}^{repeat}$ repetitions) by $\Delta_{TF\_adjust,b,f,c}(i)=10 \log_{10}((2^{K_2 \cdot BPRE}-1))-10 \log_{10}(K_1 \cdot (n_{HARQ-ACK}+O_{SR}+O_{CSI})/N_{RE})$.

In addition to adjusting a number of repetitions for a PUCCH transmission or a power of a PUCCH transmission with repetitions depending on a UCI payload, a number of repetitions for a PUCCH transmission or a power of a PUCCH transmission can also be adjusted based on a number of symbols of a slot available for each repetition of a PUCCH transmission. For a PUCCH that includes HARQ-ACK information, an initial (first) symbol in a slot and a duration for each repetition of a PUCCH transmission is indicated by a DCI format associated with the HARQ-ACK information.

As the duration of each repetition for a PUCCH transmission can depend on a corresponding PUCCH resource that can vary depending on a corresponding indication by the DCI format, a number of required repetitions or a power for each repetition of the PUCCH transmission can also vary. When a UE is configured with $N_{PUCCH}^{repeat}$ repetitions of a PUCCH transmission, the UE can also be provided a reference number of symbols $N_{PUCCH,ref}^{repeat,symb}$ in a slot corresponding to the $N_{PUCCH}^{repeat}$ repetitions. When a duration for a repetition of a PUCCH transmission in a slot is smaller than $N_{PUCCH,ref}^{repeat,symb}$, the UE can increase a PUCCH transmission power while when a duration for a repetition of a PUCCH transmission in a slot is larger than $N_{PUCCH,ref}^{repeat,symb}$, the UE can decrease a PUCCH transmission power.

Alternatively, when a duration for a repetition of a PUCCH transmission in a slot is smaller than $N_{PUCCH,ref}^{repeat,symb}$, the UE can increase a number of repetitions while when a duration for a repetition of a PUCCH transmission in a slot is larger than $N_{PUCCH,ref}^{repeat,symb}$, the UE can decrease a number of repetitions for a PUCCH transmission.

A power adjustment (positive or negative or zero) is $$\Delta_{TF,b,f,c}(i) = 10\log_{10}\left(\frac{N_{symb}^{PUCCH}}{N_{PUCCH,ref}^{repeat,symb}}\right) dB.$$

For example, when $N_{PUCCH,ref}^{repeat,symb}=4$ (a minimum number of symbols in a slot for a repetition of a PUCCH transmission) and a repetition of a PUCCH transmission is over $N_{symb}^{PUCCH}$, the UE can decrease a transmission power by $$\Delta_{TF,b,f,c}(i) = 10\log_{10}\left(\frac{N_{symb}^{PUCCH}}{N_{PUCCH,ref}^{repeat,symb}}\right) \text{ dB}.$$

For example, when $N_{PUCCH,ref}^{repeat,symb}=14$ (a maximum number of symbols in a slot for a repetition of a PUCCH transmission) and a repetition of a PUCCH transmission is over $N_{symb}^{PUCCH}$, the UE can increase a transmission power by $$\Delta_{TF,b,f,c}(i) = 10\log_{10}\left(\frac{N_{symb}^{PUCCH}}{N_{PUCCH,ref}^{repeat,symb}}\right) \text{ dB}.$$

An adjustment for a number of repetitions, when there is no power adjustment, can be by a factor of $\lceil N_{PUCCH,ref}^{repeat,symb}/N_{symb}^{PUCCH}\rceil$ for a resulting number of $\lceil N_{PUCCH,ref}^{repeat,symb}/N_{symb}^{PUCCH}\rceil \cdot N_{PUCCH}^{repeat}$ repetitions when $N_{PUCCH,ref}^{repeat,symb}>N_{symb}^{PUCCH}$, or by a factor of $\lceil N_{symb}^{PUCCH}/N_{PUCCH,ref}^{repeat,symb}\rceil$ for a resulting number of $\lceil N_{symb}^{PUCCH}/N_{PUCCH,ref}^{repeat,symb}\rceil \cdot N_{PUCCH}^{repeat}$ repetitions when $N_{PUCCH,ref}^{repeat,symb}>N_{symb}^{PUCCH}$ (the "floor" function instead of the "ceiling" function can be used as an alternative).

A sixth embodiment of this disclosure considers a dynamic determination for a number of repetitions for a PUCCH transmission.

A dynamic determination for a number of repetitions for a PUCCH transmission is beneficial when channel medium conditions or transmission/reception conditions of a PUCCH transmission dynamically change and the UE needs to increase a PUCCH transmission power, potentially above a maximum allowed transmission power, when the conditions degrade, or decrease a PUCCH transmission power when the conditions improve. For example, such conditions can include dynamic changes in shadowing, or dynamic changes in transmission/reception beams providing sufficiently large SINR, or addition/removal of reception points, and so on. In such cases, it is beneficial to enable a network to dynamically vary a number of repetitions for a PUCCH transmission even for a same UCI payload.

A dynamic indication for a number of repetitions for a PUCCH transmission is provided by a DCI format associated with the PUCCH transmission, for example when the PUCCH includes HARQ-ACK information. The indication for a number of repetitions for a PUCCH transmission can be explicit, by including a corresponding field in the DCI format, or implicit based on the value of another field in the DCI format.

In a first approach, an implicit indication can be provided by associating a transmission configuration indicator (TCI) state indicated by the DCI format, and related to quasi-collocation information for a UE to determine a spatial filter to apply for the PUCCH transmission, with a number of PUCCH repetitions. For example, a first TCI state can be associated by higher layers with a first number of repetitions for a PUCCH transmission and a second TCI state can be associated by higher layers with a second number of repetitions for a PUCCH transmission. The DCI format can indicate a TCI state for a PUCCH transmission and the UE can determine a number of repetitions for the PUCCH transmission based on the association/mapping provided by higher layers between TCI states and numbers of repetitions for the PUCCH transmission. The DCI format can indicate a TCI state regardless of whether or not an associated PUCCH transmission is configured with repetitions.

The mapping of TCI states to numbers of repetitions for a PUCCH transmission can be separately configured for each PUCCH format or can be common for all PUCCH formats. A determination for a number of repetitions for a PUCCH transmission can also be combined with the fifth embodiment of this disclosure where the association between a TCI state and a number of repetitions for a PUCCH transmission can be for a reference UCI payload (that can also be provided by higher layers or can be predetermined in the system operation) and the UE can adjust a number of repetitions of a PUCCH transmission based on a UCI payload included in the PUCCH transmission.

When the DCI format does not include a field indicating a TCI state, from a configured set of TCI states, the TCI state with index zero from the configured set of TCI states or the TCI state in a last DCI format that includes a field indicating a TCI state that the UE detects can be used to determine a number of PUCCH repetitions. The first approach can also apply when a UE is not configured with repetitions for a PUCCH transmission and in such case a TCI state can be associated a value, from a configured set of values, for $P_{O\_PUCCH,b,f,c}(q_u)$ or $\Delta_{F\_PUCCH}(F)$.

In a second approach, an implicit indication can be provided by associating a PUCCH resource indicated by the DCI format with a number of PUCCH repetitions. For example, a first PUCCH resource can be associated by higher layers with a first number of repetitions for a PUCCH transmission, such as single transmission in a slot, and a second PUCCH resource can be associated by higher layers with a second number of repetitions for a PUCCH transmission, such as two transmissions in same symbols over two corresponding slots.

The DCI format can indicate a resource for a PUCCH transmission and the UE can determine a number of repetitions for the PUCCH transmission based on an association provided by higher layers between PUCCH resources and numbers of repetitions for the PUCCH transmission or by including a number of repetitions are part of a configuration for parameters associated with a PUCCH resource. This can be combined with the fifth embodiment of this disclosure where the association between a PUCCH resource and a number of repetitions for a PUCCH transmission can be for a reference UCI payload (that can also be provided by higher layers or can be predetermined in the system operation) and the UE can adjust a number of repetitions of a PUCCH transmission based on a UCI payload included in the PUCCH transmission. The second approach can also apply when a UE is not configured with repetitions for a PUCCH transmission and in such case a PUCCH resource can be associated a value, from a configured set of values, for $P_{O\_PUCCH,b,f,c}(q_u)$ or $\Delta_{F\_PUCCH}(F)$.

In a third approach, an implicit indication can be provided by associating a TPC command value indicated by the DCI format with a number of PUCCH repetitions. For example, a predetermined TPC command value can be associated with a number of repetitions for a PUCCH transmission that is provided by higher layers. This can be combined with the fifth embodiment of this disclosure where the association between a TPC command value and a number of repetitions for a PUCCH transmission can be for a reference UCI payload (that can also be provided by higher layers or can be predetermined in the system operation) and the UE can adjust a number of repetitions of a PUCCH transmission based on a UCI payload included in the PUCCH transmission.

provided for each PUCCH format. Further, $\Delta_{F\_PUCCH}(F)$ can be replaced $\Delta_{UCI\text{-}type}$ and equation 5 can be replaced by equation 6.

It is also possible that $\Delta_{UCI\text{-}type}$ is not provided for one UCI type, such as for example for HARQ-ACK, and default value such as 0 is used in that case. The $\Delta_{UCI\text{-}type}$ values can be positive or negative.

$$P_{PUCCH,b,f,c}(i, q_u, q_d, l) = \min \left\{ \begin{array}{l} P_{CMAX,f,c}(i), \\ P_{O\_PUCCH,b,f,c}(q_u) + 10\log_{10}(2^\mu \cdot M_{RB,b,f,c}^{PUCCH}(i)) + PL_{b,f,c}(q_d) + \\ \Delta_{UCI\text{-}type} + \Delta_{TF,b,f,c}(i) + g_{b,f,c}(i, l) \end{array} \right\} \text{[dbM]} \quad \text{equation 6}$$

Figure 15:
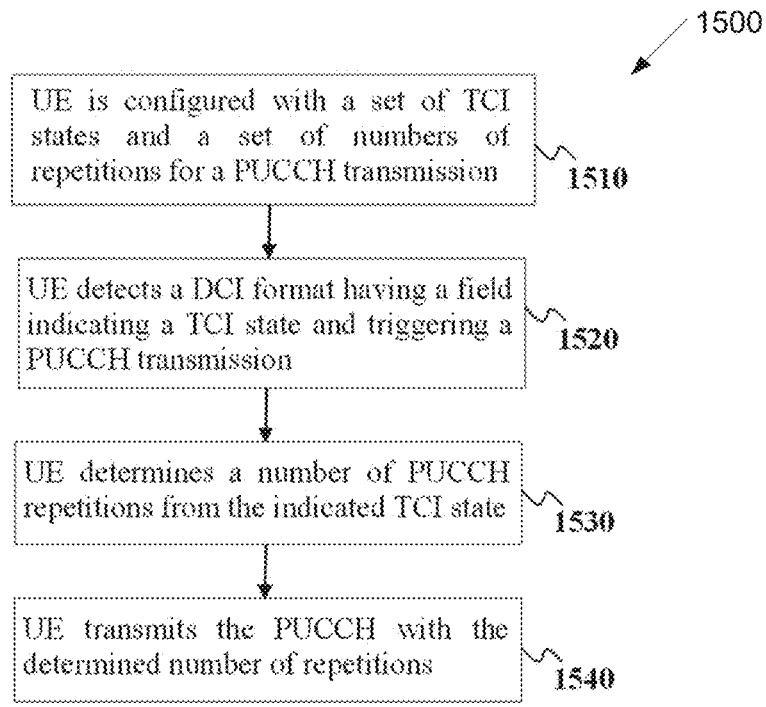
FIG. 15 illustrates a flow chart of a method for determination for a number of repetitions of a PUCCH transmission based on an indicated TCI state in a DCI format triggering the PUCCH transmission according to embodiments of the present disclosure.

FIG. 15 illustrates a flow chart of a method 1500 for determination for a number of repetitions of a PUCCH transmission based on an indicated TCI state in a DCI format triggering the PUCCH transmission according to embodiments of the present disclosure. The embodiment of the method 1500 illustrated in FIG. 15 is for illustration only and could have the same or similar configuration. FIG. 15 does not limit the scope of this disclosure to any particular implementation.

A UE is provided by higher layers a set of TCI states and a set of numbers of repetitions for a PUCCH transmission 1510. Each element of the set of numbers of repetitions for a PUCCH transmission is mapped to an element of the set of TCI states, for example through a one-to-one mapping or a many-to-one mapping. The UE detects a DCI format that triggers a PUCCH transmission and includes a field indicating a TCI state for the PUCCH transmission 1520. The UE determines a number of repetitions for the PUCCH transmission, for a corresponding UCI payload, based on the mapping of the indicated TCI state to an element from the set of numbers of repetitions for a PUCCH transmission 1530. The UE transmits the PUCCH using the determined number of repetitions 1540.

In a fourth approach, a number of repetitions for a PUCCH transmission that includes HARQ-ACK information can be determined based on a DCI format associated with the HARQ-ACK information. For example, a UE can transmit a PUCCH with a first number of repetitions when a corresponding HARQ-ACK information is associated with a first DCI format and can transmit a PUCCH with a second number of repetitions when a corresponding HARQ-ACK information is associated with a second DCI format. The first and second DCI formats can be differentiated by respective first and second RNTIs used to scramble respective CRC bits, by respective first and second DCI format sizes, or a by a field in each DCI format indicating whether the DCI format is a first DCI format or a second DCI format.

A seventh embodiment of this disclosure considers a determination of a PUCCH transmission power or of a number of repetitions for a PUCCH transmission depending on a UCI type.

Higher layers can provide separate configuration per UCI type for a same PUCCH format for values of open-loop power control parameters, such as $P_{O\_PUCCH,b,f,c}(q_u)$ or $\Delta_{F\_PUCCH}(F)$. Alternatively, the formula in equation 5 for determining a PUCCH transmission power can include an additional term, $\Delta_{UCI\text{-}type}$, that is provided by higher layers for a UCI type (HARQ-ACK information, SR, or CSI) and can be common for all applicable PUCCH formats, such as PUCCH format 3 or PUCCH format 4, or can be separately With a separate configuration of one or more open loop parameters per UCI type, a PUCCH transmission power can be independent among UCI types. For example, for a same payload, a PUCCH transmission power can be different when the PUCCH includes HARQ-ACK information than when the PUCCH includes CSI. The closed loop power control parameters can be common for the different UCI types as a typical purpose of closed-loop power control in to track variations in a channel medium. Similar, higher layers can provide separate configuration per UCI type for a number of PUCCH repetitions. For example, when a UE transmits a PUCCH using PUCCH format 3 and for a given UCI payload, the UE can be configured by higher layers to transmit CSI using 2 repetitions and to transmit HARQ-ACK using 4 repetitions.

When different UCI types are multiplexed in a same PUCCH, a UE can be configured by higher layers the values of the open-loop power control parameters, or the number of PUCCH repetitions, to use for the PUCCH transmission. It is also possible that the UE determines those values by a predetermined rule without higher layer signaling. For example, the UE can use the values configured for transmission of HARQ-ACK information in a PUCCH when the UE multiplexes HARQ-ACK information and SR or CSI in a same PUCCH. For example, the UE can use the larger $P_{O\_PUCCH,b,f,c}(q_u)$ value, or the larger $\Delta_{F\_PUCCH}(F)$ value, or the larger $\Delta_{UCI\text{-}type}$ value when the UE multiplexes different corresponding UCI types in a PUCCH transmission.

Figure 16:
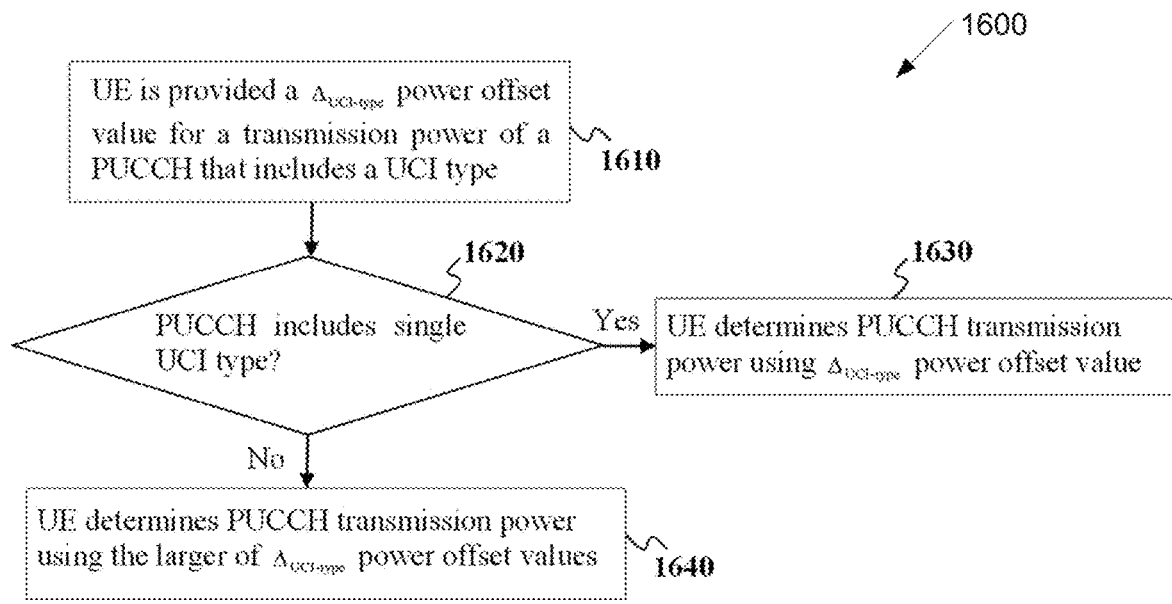
FIG. 16 illustrates a flow chart of a method for determination for a PUCCH transmission power based on a UCI type that is included in the PUCCH transmission according to embodiments of the present disclosure.

FIG. 16 illustrates a flow chart of a method 1600 for determination for a PUCCH transmission power based on a UCI type that is included in the PUCCH transmission according to embodiments of the present disclosure. The embodiment of the method 1400 illustrated in FIG. 16 is for illustration only and could have the same or similar configuration. FIG. 16 does not limit the scope of this disclosure to any particular implementation.

A UE is provided by higher layers a power offset value $\Delta_{HARQ\text{-}ACK}$ for a PUCCH transmission that includes HARQ-ACK information, or a power offset value $\Delta_{SR}$ for a PUCCH transmission that includes SR, or a power offset value $\Delta_{CSI}$ for a PUCCH transmission that includes CSI 1610. The UE determines whether or not a single UCI type is included in the PUCCH 1620. When a single UCI type is included in the PUCCH, the UE determines a PUCCH transmission power using the $\Delta_{HARQ\text{-}ACK}$ power offset value when the PUCCH includes only HARQ-ACK information, or using the $\Delta_{SR}$ power offset value when the PUCCH includes only SR, or using the $\Delta_{CSI}$ power offset value when the PUCCH includes only CSI 1630. When multiple UCI types are included in the PUCCH, the UE uses the larger of the corresponding $\Delta_{UCI\text{-}type}$ values 1640.

A eighth embodiment of this disclosure considers a determination for a number of slots for a PUCCH transmission in order for a UE to avoid dropping UCI or to transmit UCI with a code rate that is smaller than or equal to a code rate provided to the UE by higher layers.

A UE can be configured by higher layers to extend a PUCCH transmission, with an indicated first and last symbol in a slot, over multiple slots subject to a resulting code rate being smaller than or equal to a code rate r provided to a UE by higher layers. Unlike repetitions of a PUCCH transmission where the encoding of UCI bits considers rate matching over available REs over one slot and repeats across slots, for a PUCCH transmission extended over multiple slots, the encoding of UCI bits considers rate matching over available REs of the multiple slots. The UE can also be provided by higher layers a maximum number of slots $N_{slot}^{PUCCH}$ for extending a PUCCH transmission. A number of RBs for the PUCCH transmission is same in all slots of the PUCCH transmission.

The UE determines a minimum number of slots, $N_{slot,min}^{PUCCH}$, that is smaller than or equal to a number of slots $N_{slot}^{PUCCH}$ provided by higher layers, and result to a code rate for the UCI (including CRC, when any) transmission in a PUCCH that is smaller than or equal to a code rate r provided to a UE by higher layers. Denoting by $M_{RB}^{PUCCH}$ a number of RBs for a PUCCH transmission (can be a maximum number of RBs available for PUCCH transmission), by $N_{sc,ctrl}^{RB}$ a number of subcarriers per RB (REs) that are available for UCI transmission in the PUCCH, by $N_{symb-UCI}^{PUCCH}$ a number of symbols in a slot for UCI transmission in the PUCCH, and by $Q_m$ a number of modulation symbols per RE (modulation order), it is $O_{UCI} \le M_{RB}^{PUCCH} \cdot N_{sc,ctrl}^{RB} \cdot N_{symb-UCI}^{PUCCH} \cdot N_{slot,min}^{PUCCH} \cdot Q_m \cdot r$ and $O_{UCI} > M_{RB}^{PUCCH} \cdot N_{sc,ctrl}^{RB} \cdot N_{symb-UCI}^{PUCCH} \cdot (N_{slot,min}^{PUCCH} - 1) \cdot Q_m \cdot r$, where $O_{UCI}$ is a number of UCI bits including CRC bits, when any. The UE transmits the PUCCH over the minimum number of slots $N_{slot,min}^{PUCCH}$.

When a code rate for UCI transmission over $N_{slot}^{PUCCH}$ slots is larger than r, that is when $O_{UCI} > M_{RB}^{PUCCH} \cdot N_{sc,ctrl}^{RB} \cdot N_{symb-UCI}^{PUCCH} \cdot N_{slot}^{PUCCH} \cdot Q_m \cdot r$, the UE first drops UCI, such as CSI reports or part 2 of CSI reports when applicable, and transmits the UCI in a PUCCH over the $N_{slot}^{PUCCH}$ slots even when a resulting code rate is larger than r. The UE can also be configured by higher layers to apply HARQ-ACK bundling in a spatial, time, or cell domain when the UE has dropped all CSI reports, or has dropped all CSI part 2 reports, and a resulting code rate remains larger than r, that is when $O_{UCI} > M_{RB}^{PUCCH} \cdot N_{sc,ctrl}^{RB} \cdot N_{symb-UCI}^{PUCCH} \cdot N_{slot}^{PUCCH} \cdot Q_m \cdot r$.

Figure 17:
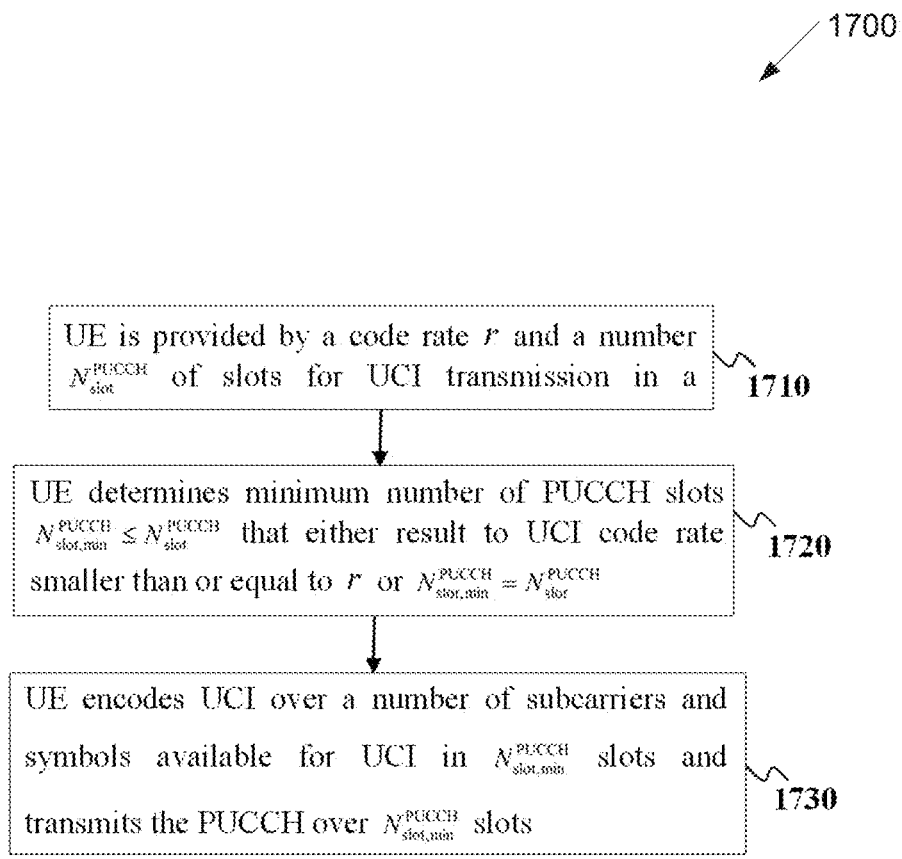
FIG. 17 illustrates a flow chart of a method for determination for a number of slots for a PUCCH transmission based on a code rate and a number of slots provided by higher layers according to embodiments of the present disclosure.

FIG. 17 illustrates a flow chart of a method 1700 for determination for a number of slots for a PUCCH transmission based on a code rate and a number of slots provided by higher layers according to embodiments of the present disclosure. The embodiment of the method 1700 illustrated in FIG. 17 is for illustration only and could have the same or similar configuration. FIG. 17 does not limit the scope of this disclosure to any particular implementation.

A UE is provided by higher layers a code rate r and a (maximum) number $N_{slot}^{PUCCH}$ of slots for UCI transmission in a PUCCH 1710. The UE determines a minimum number of slots $N_{slot,min}^{PUCCH} \le N_{slot}^{PUCCH}$ for the PUCCH transmission that either results to a UCI code rate smaller than or equal to r or $N_{slot,min}^{PUCCH} = N_{slot}^{PUCCH}$ 1720. The UE encodes the UCI over a number of subcarriers and symbols available for UCI transmission in $N_{slot,min}^{PUCCH}$ slots and transmits the PUCCH over the $N_{slot,min}^{PUCCH}$ slots 1730.

Instead of determining a number of slots, up to a maximum number of slots provided by higher layers, for a PUCCH transmission based on a resulting UCI code rate being smaller than or equal to a code rate provided by higher layers, the eighth embodiment can also apply in a similar manner for determining a number of symbols in a slot. A UE can be provided only a first symbol and a maximum number of symbols for a PUCCH transmission in a slot and the UE can adaptively determine a number of symbols for the PUCCH transmission in the slot based on a resulting UCI code rate being smaller than or equal to a code rate provided by higher layers.

To enable different reception reliability targets for different UCI types, a code rate r provided to a UE by higher layers can also be independently provided per UCI type. For example, a UE can be separately provided by higher layers a first code rate r for HARQ-ACK transmission and a second code rate r for CSI transmission.

The code rate r provided to a UE by higher layers can also be independently provided per service type. For example a UE can be separately provided by higher layers a first code rate $r_1$ for HARQ-ACK transmission corresponding to a first service type such as mobile broadband and a second code rate $r_2$ for HARQ-ACK transmission corresponding to a second service type such as ultra-reliable low latency communications. The UE can determine the code rate to apply based, for example, on an indication by a DCI format scheduling a PDSCH reception that is associated with the HARQ-ACK transmission, such as a value of a field in the DCI format, a RNTI used to scramble a CRC of the DCI format, a size of the DCI format, and so on. When different UCI types are jointly multiplexed (coded) in a same PUCCH, the smaller of the corresponding code rates can be used to determine a number of resources, such as a number of RBs, a number of symbols of a slot, or a number of slots, or to determine UCI dropping requirements when the smaller of the code rates is not fulfilled when all UCI is transmitted.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:
1. A method comprising:
receiving a physical downlink control channel (PDCCH) that provides a first downlink control information (DCI) format;
decoding the first DCI format, wherein the first DCI format:
schedules a physical uplink shared channel (PUSCH) transmission, and
includes a first field indicating whether or not uplink shared channel (UL-SCH) information is multiplexed in the PUSCH;

determining to multiplex or not multiplex UL-SCH information in the PUSCH depending on the indication in the first field; and transmitting the PUSCH based on the determination.

2. The method of claim 1, wherein the first field includes 1 bit.

3. The method of claim 1, wherein:

the first DCI format includes a second field indicating whether or not channel state information (CSI) is multiplexed in the PUSCH, and when the first field indicates that UL-SCH information is not multiplexed in the PUSCH, the second field indicates that the CSI is multiplexed in the PUSCH.

4. The method of claim 1, further comprising:

receiving a number of physical downlink shared channels (PDSCHs) that provide a number of transport blocks (TB s); and determining a number of coded modulation symbols for multiplexing acknowledgement information for the TBs in the PUSCH depending on:

a number of data information bits multiplexed in the PUSCH when the first field indicates that UL-SCH information is multiplexed in the PUSCH, and a value of a modulation and coding scheme (MCS) field in the first DCI format when the first field indicates that UL-SCH information is not multiplexed in the PUSCH.

5. The method of claim 3, wherein:

the PUSCH transmission is a first PUSCH transmission on a first cell and overlaps in time with a second PUSCH transmission on a second cell, the second PUSCH transmission on the second cell is configured by higher layer signaling, and the CSI is multiplexed in the first PUSCH transmission on the first cell.

6. The method of claim 3, wherein:

the PUSCH transmission is a first PUSCH transmission on a first cell having a first index and overlaps in time with a second PUSCH transmission on a second cell having a second index, the second PUSCH transmission on the second cell is scheduled by a second DCI format, and the CSI is multiplexed in one of the first and second PUSCH transmissions that is on one of the first and second cells that has the smaller of the two indexes.

7. The method of claim 1, further comprising:

decoding a second DCI format, wherein the second DCI format:

schedules a reception of data information in a physical downlink shared channel (PDSCH), and indicates a transmission time for a physical uplink control channel (PUCCH) with acknowledgement information in response to the reception of data information; and multiplexing the acknowledgement information in the PUSCH when a time between a last symbol of the PDSCH reception and a first symbol of the PUSCH transmission is smaller than or equal to a predetermined time.

8. A user equipment (UE) comprising:

a receiver configured to receive a physical downlink control channel (PDCCH) that provides a first downlink control information (DCI) format;

a decoder configured to decode the first DCI format, wherein the first DCI format:

schedules a physical uplink shared channel (PUSCH) transmission, and includes a first field indicating whether or not uplink shared channel (UL-SCH) information is multiplexed in the PUSCH;

a multiplexer configured to multiplex or not multiplex UL-SCH information in the PUSCH depending on the indication in the first field; and a transmitter configured to transmit the PUSCH.

9. The UE of claim 8, wherein the first field includes 1 bit.

10. The UE of claim 8, wherein:

the first DCI format includes a second field indicating whether or not channel state information (CSI) is multiplexed in the PUSCH, and when the first field indicates that UL-SCH information is not multiplexed in the PUSCH, the second field indicates that the CSI is multiplexed in the PUSCH.

11. The UE of claim 8, wherein:

the receiver is further configured to receive a number of physical downlink shared channels (PDSCHs) that provide a number of transport blocks (TBs); and the multiplexer is further configured to multiplex a number of coded modulation symbols for acknowledgement information for the TBs in the PUSCH that is determined depending on:

a number of data information bits multiplexed in the PUSCH when the first field indicates that UL-SCH information is multiplexed in the PUSCH, and a value of a modulation and coding scheme (MCS) field in the first DCI format when the first field indicates that UL-SCH information is not multiplexed in the PUSCH.

12. The UE of claim 10, wherein:

the PUSCH transmission is a first PUSCH transmission on a first cell and overlaps in time with a second PUSCH transmission on a second cell, the second PUSCH transmission on the second cell is configured by higher layer signaling, and the multiplexer is further configured to multiplex the CSI in the first PUSCH transmission on the first cell.

13. The UE of claim 10, wherein:

the PUSCH transmission is a first PUSCH transmission on a first cell having a first index and overlaps in time with a second PUSCH transmission on a second cell having a second index, the second PUSCH transmission on the second cell is scheduled by a second DCI format, and the multiplexer is further configured to multiplex the CSI in one of the first and second PUSCH transmissions that is on one of the first and second cells that has the smaller of the two indexes.

14. The UE of claim 8, wherein:

the decoder is further configured to decode a second DCI format, wherein the second DCI format:

schedules a reception of data information in a physical downlink shared channel (PDSCH), and indicates a transmission time for a physical uplink control channel (PUCCH) with acknowledgement information in response to the reception of data information; and the multiplexer is further configured to multiplex the acknowledgement information in the PUSCH when a time between a last symbol of the PDSCH reception and a first symbol of the PUSCH transmission is smaller than or equal to a predetermined time.

15. A base station comprising:
an encoder configured to encode a first downlink control information (DCI) format, wherein the first DCI format:
schedules a physical uplink shared channel (PUSCH) transmission, and
includes a first field indicating whether or not uplink shared channel (UL-SCH) information is multiplexed in the PUSCH;
a transmitter configured to transmit a physical downlink control channel (PDCCH) with the first DCI format;
a receiver configured to receive the PUSCH; and
a de-multiplexer configured to de-multiplex or not de-multiplex UL-SCH information in the PUSCH depending on the indication in the first field.

16. The base station of claim 15, wherein the first field includes 1 bit.

17. The base station of claim 15, wherein:
the first DCI format includes a second field indicating whether or not channel state information (CSI) is multiplexed in the PUSCH, and
when the first field indicates that UL-SCH information is not multiplexed in the PUSCH, the second field indicates that the CSI is multiplexed in the PUSCH.

18. The base station of claim 15, wherein:
the transmitter is further configured to transmit a number of physical downlink shared channels (PDSCHs) that provide a number of transport blocks (TBs); and
the de-multiplexer is further configured to de-multiplex a number of coded modulation symbols for acknowledgement information for the TBs in the PUSCH that is determined depending on:
a number of data information bits multiplexed in the PUSCH when the first field indicates that UL-SCH information is multiplexed in the PUSCH, and
a value of a modulation and coding scheme (MCS) field in the first DCI format when the first field indicates that UL-SCH information is not multiplexed in the PUSCH.

19. The base station of claim 17, wherein:
the PUSCH reception is a first PUSCH reception on a first cell and overlaps in time with a second PUSCH reception on a second cell,
the second PUSCH reception on the second cell is configured by higher layer signaling, and
the de-multiplexer is further configured to de-multiplex the CSI in the first PUSCH reception on the first cell.

20. The base station of claim 17, wherein:
the PUSCH reception is a first PUSCH reception on a first cell having a first index and overlaps in time with a second PUSCH reception on a second cell having a second index,
the second PUSCH reception on the second cell is scheduled by a second DCI format, and
the de-multiplexer is further configured to de-multiplex the CSI in one of the first and second PUSCH receptions that is on one of the first and second cells that has the smaller of the two indexes.

* * * * *